(12) United States Patent
Zhang et al.

(10) Patent No.: US 10,439,931 B2
(45) Date of Patent: Oct. 8, 2019

(54) DATA PACKET PROCESSING METHOD, SERVICE NODE, AND DELIVERY NODE

(71) Applicant: Huawei Technologies Co., Ltd., Shenzhen (CN)

(72) Inventors: Lin Zhang, Shenzhen (CN); Chenghe Yin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 16 days.

(21) Appl. No.: 15/385,470

(22) Filed: Dec. 20, 2016

(65) Prior Publication Data

US 2017/0104671 A1  Apr. 13, 2017

Related U.S. Application Data

(63) Continuation of application No. PCT/CN2015/076778, filed on Apr. 16, 2015.

(30) Foreign Application Priority Data

Jun. 27, 2014 (CN) .......................... 2014 1 0301535

(51) Int. Cl.
*H04L 12/721* (2013.01)
*H04L 29/06* (2006.01)
*H04L 29/12* (2006.01)
*H04L 12/46* (2006.01)

(52) U.S. Cl.
CPC .......... *H04L 45/38* (2013.01); *H04L 12/4633* (2013.01); *H04L 61/2007* (2013.01); *H04L 69/22* (2013.01)

(58) Field of Classification Search
CPC ...... H04L 45/38; H04L 12/4633; H04L 69/22
See application file for complete search history.

(56) References Cited

U.S. PATENT DOCUMENTS

| 7,490,153 | B1* | 2/2009 | Krishnan | ............ G06F 11/1479 709/205 |
| 7,860,100 | B2* | 12/2010 | Khalid | ................ H04L 41/5003 370/229 |
| 7,895,425 | B2* | 2/2011 | Khalid | ................ H04L 12/4633 709/226 |

(Continued)

FOREIGN PATENT DOCUMENTS

| CN | 101772918 A | 7/2010 |
| CN | 103581018 A | 2/2014 |

*Primary Examiner* — Rasheed Gidado
(74) *Attorney, Agent, or Firm* — Leydig, Voit & Mayer, Ltd.

(57) ABSTRACT

The present disclosure discloses a data packet processing method, a service node, and a delivery node, to improve the data packet processing efficiency. A second service node receives a first uplink data packet sent by a first service node. The second service node performs service processing on the first uplink data packet to obtain a second uplink data packet. When the second service node determines, according to service node information, that the second service node is the last service node in an uplink direction of a service chain, the second service node deletes the service node information from the second uplink data packet, to obtain a third uplink data packet, and sends the third uplink data packet to a second delivery node, where the second delivery node is an uplink egress delivery node of the service chain.

20 Claims, 13 Drawing Sheets

(56) References Cited

U.S. PATENT DOCUMENTS

| | | | |
|---|---|---|---|
| 8,743,885 B2* | 6/2014 | Khan | H04L 45/308 |
| | | | 370/395.21 |
| 9,326,182 B2* | 4/2016 | Baillargeon | H04W 72/1226 |
| 9,444,675 B2* | 9/2016 | Guichard | H04L 41/5038 |
| 9,935,827 B2* | 4/2018 | Jain | H04L 41/0813 |
| 2003/0114161 A1 | 6/2003 | Rajkotia | |
| 2009/0037713 A1 | 2/2009 | Khalid et al. | |
| 2010/0080226 A1 | 4/2010 | Khalid et al. | |
| 2011/0243553 A1 | 10/2011 | Russell | |
| 2012/0136984 A1* | 5/2012 | Wang | H04L 29/12113 |
| | | | 709/223 |
| 2014/0362857 A1* | 12/2014 | Guichard | H04L 45/566 |
| | | | 370/392 |
| 2016/0050141 A1* | 2/2016 | Wu | H04L 41/5054 |
| | | | 370/389 |
| 2016/0142293 A1* | 5/2016 | Hu | H04L 45/38 |
| | | | 370/392 |

* cited by examiner

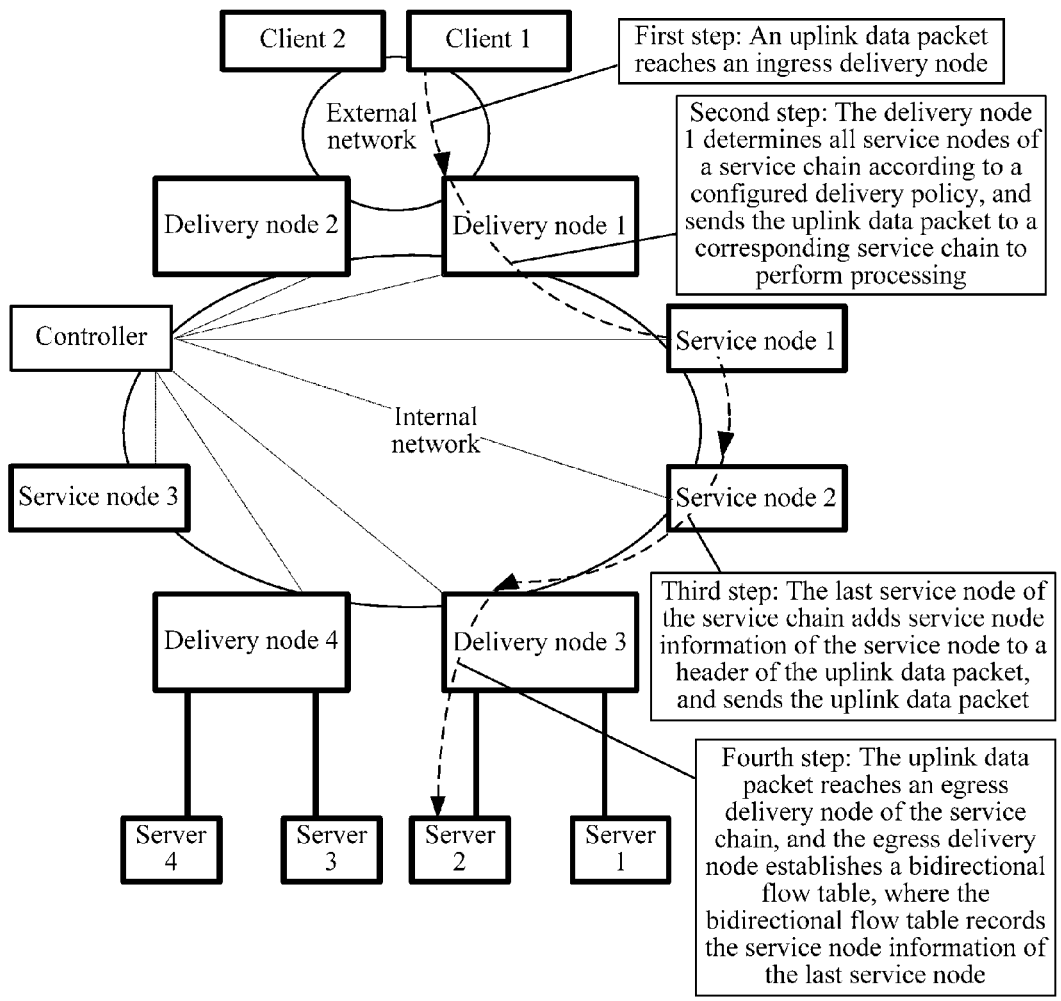
FIG. 9-a

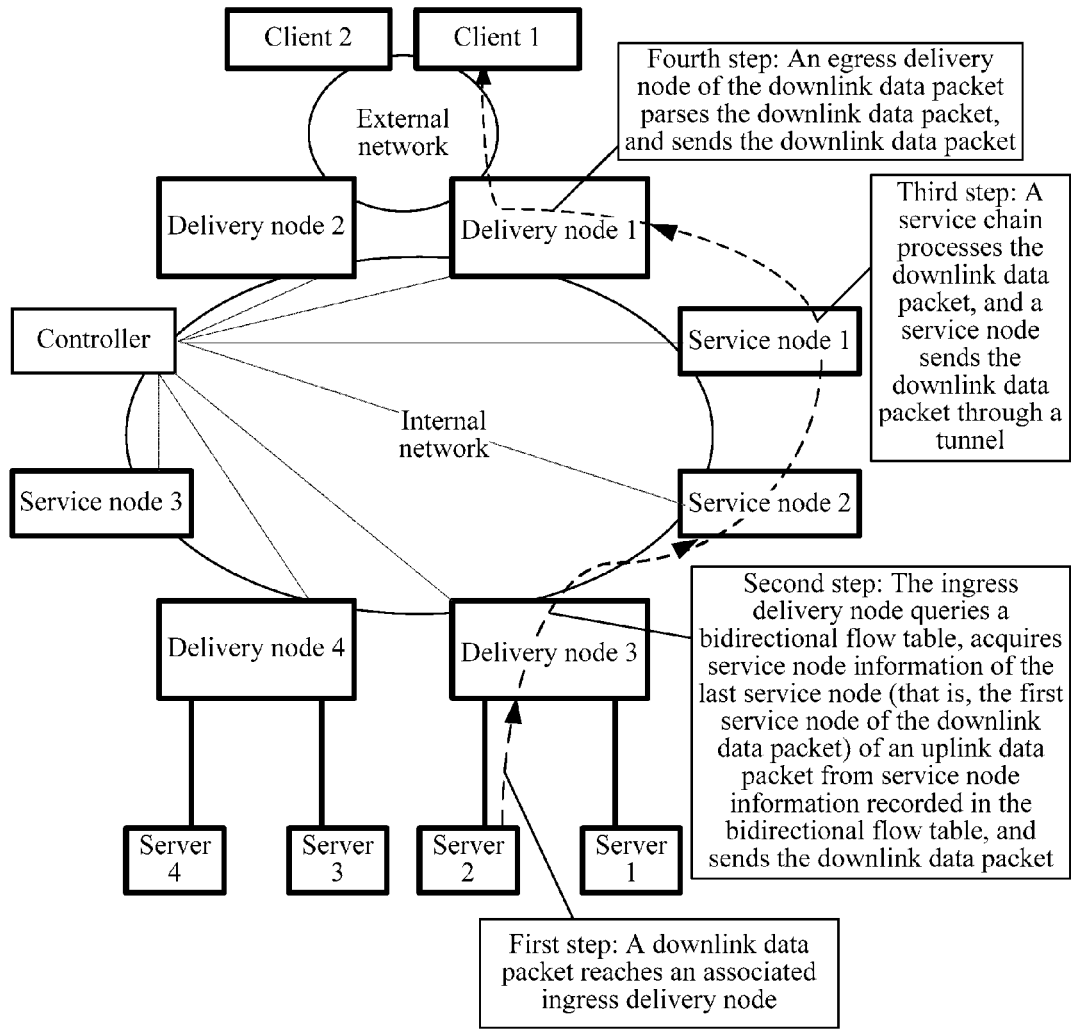
FIG. 9-b

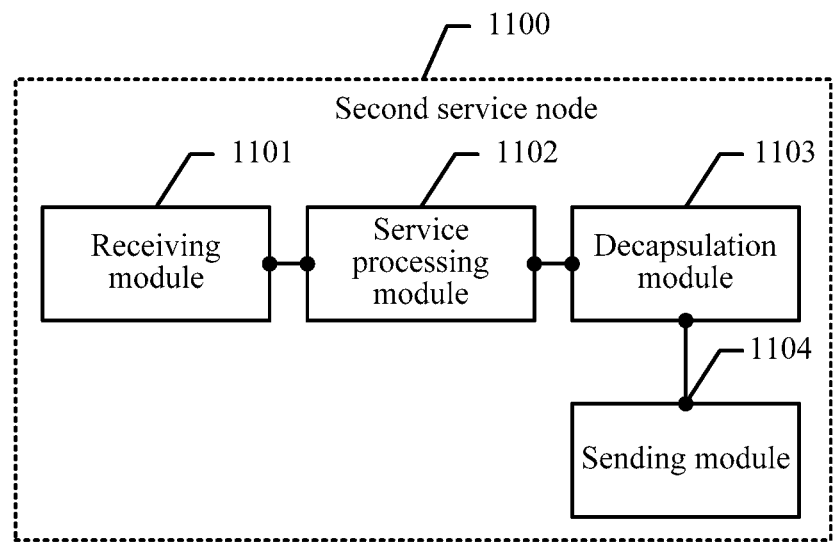
FIG. 11-a
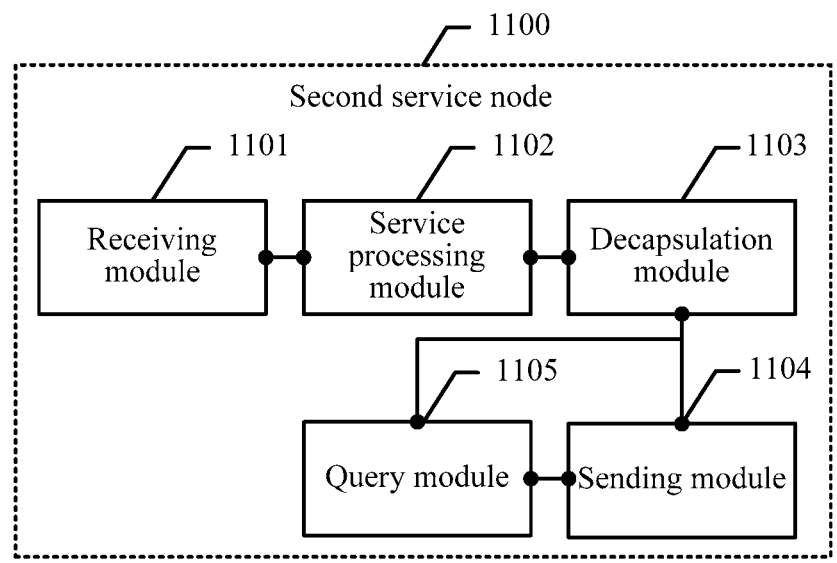
FIG. 11-b

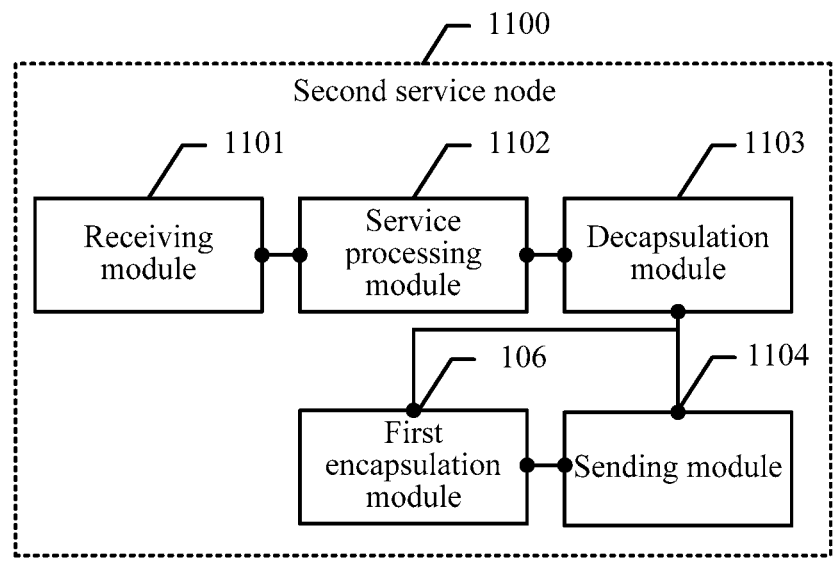
FIG. 11-c
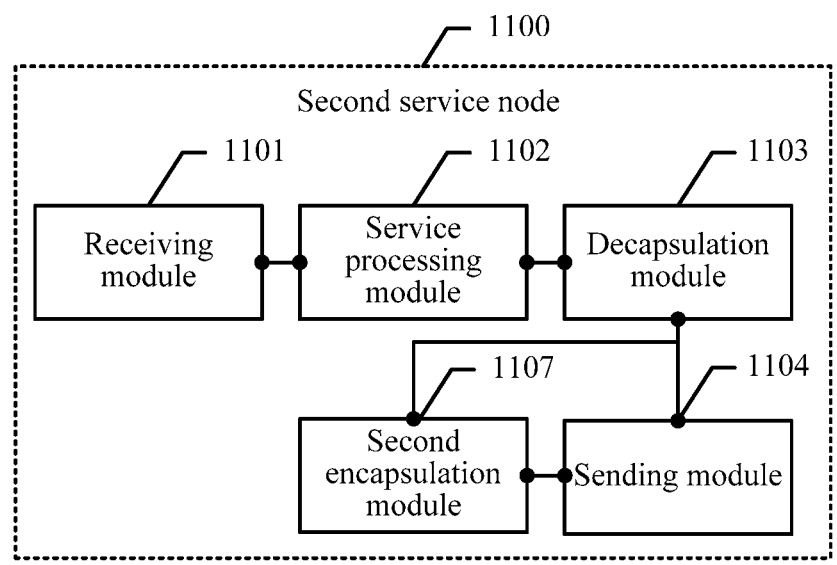
FIG. 11-d

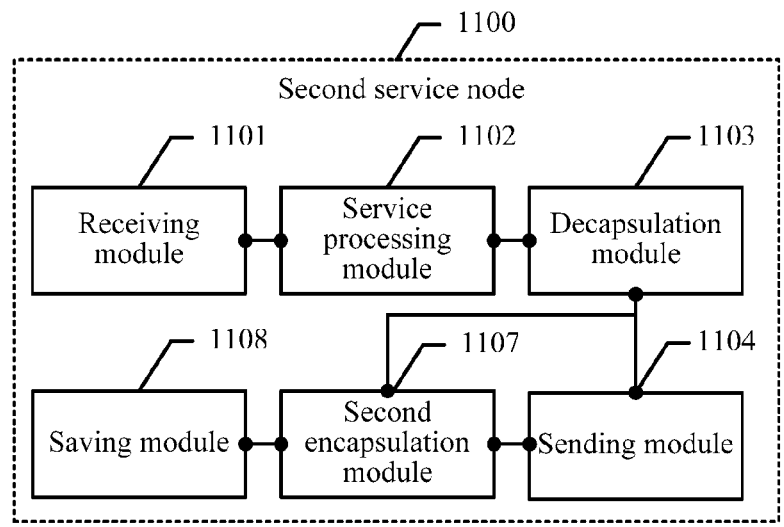
FIG. 11-e
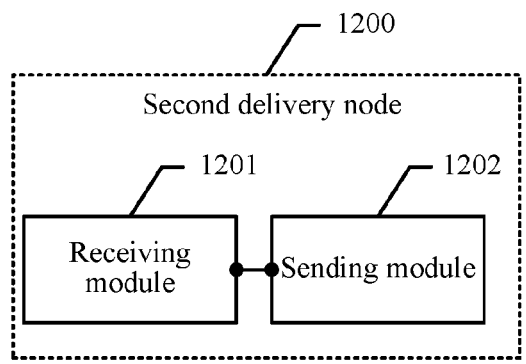
FIG. 12-a
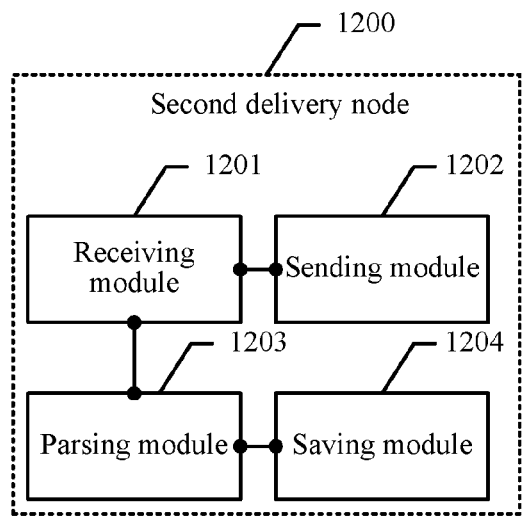
FIG. 12-b

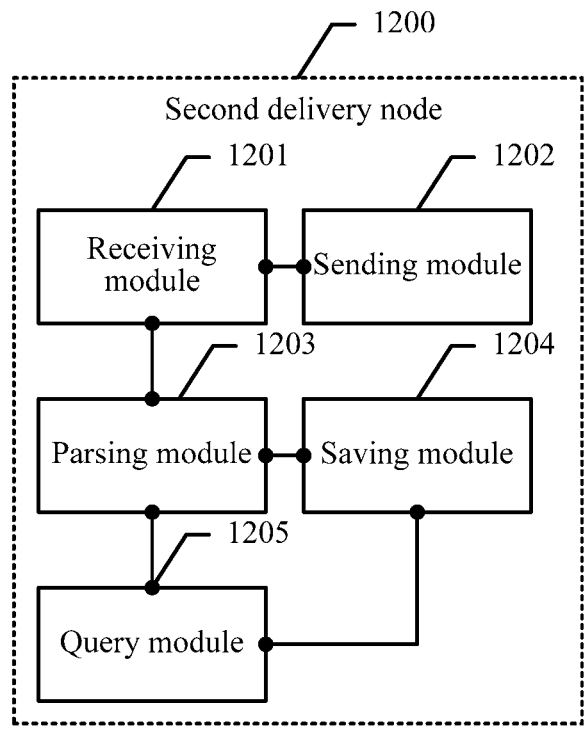
FIG. 12-c
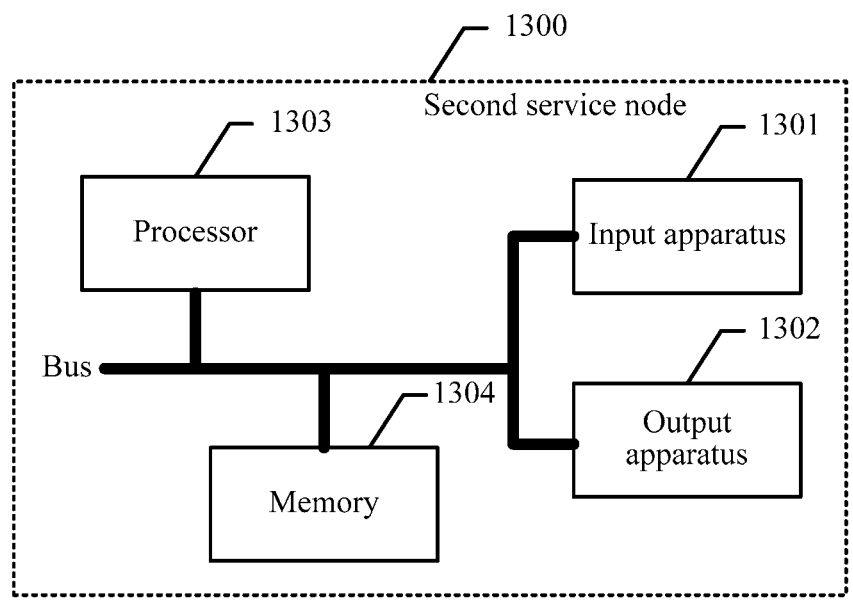
FIG. 13

| 31 | 23 | 15 | 0 |
|---|---|---|---|
| Type = 252 | Length = 12 | Reserved | |
| Service node 1 ||||
| Service node 2 ||||

| 31 | 23 | 15 | 0 |
|---|---|---|---|
| Type = 253 | Length = 12 | Reserved | |
| Last service node ||||

DATA PACKET PROCESSING METHOD, SERVICE NODE, AND DELIVERY NODE

CROSS-REFERENCE TO RELATED APPLICATIONS

This application is a continuation of International Application No. PCT/CN2015/076778, filed on Apr. 16, 2015, which claims priority to Chinese Patent Application No. 201410301535.2, filed on Jun. 27, 2014. The disclosures of the aforementioned applications are hereby incorporated by reference in their entireties.

TECHNICAL FIELD

The present disclosure relates to the field of communications technologies, and in particular, to a data packet processing method, a service node, and a delivery node.

BACKGROUND

With development of Internet economy, new services such as E-commerce, enterprise information system outsourcing, and mobile Internet are increasing. These services promote market requirements for a data center, so that a data center technology develops rapidly and new technologies emerge endlessly.

A data center generally refers to an application environment in which an entire set of integrated information technology of centralized processing, storing, transmitting, switching, and managing of data information is implemented in physical space. Key devices in a data center equipment room include computer devices, server devices, network devices, storage devices, and the like. With development of user requirements, the scale and networking complexity of a data center increase continuously, and diverse information technology (IT) applications impose a higher requirement for a data center network.

Multiple types of value-added service devices are deployed in a current data center network. In the prior art, a service chaining solution resolves a problem of flexibly deploying a value-added service device in a data center network. Referring to FIG. 1, in an existing service chaining solution, a controller, a delivery node, and service nodes are included, where the service nodes are value-added service devices, the delivery node is deployed before server 1 and server 2, and service node 1 and service node 2 are directly connected to the delivery node. The delivery node and the service nodes all are configured by the controller. The delivery node determines which data flows from a client or the servers need to be transmitted to the service nodes to be processed, and determines which service nodes to which the data flows need to be transmitted to be processed. In the data center, for each access process, there is a problem of flows in both directions, for example, an uplink flow from the client to the server and a downlink flow from the server to the client. Due to requirements of service processing on a service node, symmetric processing generally needs to be performed on flows in both directions in a service chain.

In the prior art, a process of processing an uplink data flow in a service chain is as follows: a controller first sends a service chain configuration parameter to a delivery node; when a client initiates access to a server 2, the delivery node receives a first data packet that is sent by the client and that matches the service chain configuration parameter, and first sends the first data packet to a service node 1 to perform processing; after completing processing the first data packet, the service node 1 sends a second data packet obtained after the processing to the delivery node; then, the delivery node sends the second data packet to a service node 2, and after processing the second data packet, the service node 2 sends a third data packet obtained after the processing back to the delivery node; finally, the delivery node sends the third data packet to the server 2. A process of processing a downlink data flow in the service chain is similar to that of the uplink data flow.

It is found that: in the prior art, after each service processing, a data packet obtained after processing by a service node needs to be first returned to a delivery node, and the delivery node sends the data packet to a next service node, that is, the delivery node implements centralized control on a data flow direction. Because a data packet needs to pass through a delivery node repeatedly for multiple times, if a service chain includes a relatively large quantity of service nodes, the data packet processing efficiency is very low.

SUMMARY

The present disclosure provides a data packet processing method, a service node, and a delivery node, to improve the data packet processing efficiency.

To resolve the foregoing technical problem, embodiments of the present disclosure provide the following technical solutions:

According to a first aspect, the present disclosure provides a data packet processing method, including:

receiving, by a second service node, a first uplink data packet sent by a first service node, where the first uplink data packet carries service node information corresponding to a service chain determined by a first delivery node, the first service node is a previous-hop service node, adjacent to the second service node, in the service chain, and the first delivery node is an uplink ingress delivery node of the service chain;

performing, by the second service node, service processing on the first uplink data packet, to obtain a second uplink data packet;

deleting, by the second service node, the service node information from the second uplink data packet, to obtain a third uplink data packet, when the second service node determines, according to the service node information, that the second service node is the last service node in an uplink direction of the service chain; and sending, by the second service node, the third uplink data packet to a second delivery node, where the second delivery node is an uplink egress delivery node of the service chain.

According to a second aspect, the present disclosure provides a data packet processing method, including:

receiving, by a second delivery node, a third uplink data packet sent by a second service node, where the second service node is the last service node in an uplink direction of a service chain determined by a first delivery node, the second delivery node is an uplink egress delivery node of the service chain, and the third uplink data packet is obtained after the second service node receives a first uplink data packet sent by a first service node, performs service processing on the first uplink data packet to obtain a second uplink data packet, and deletes service node information of the service chain from the second uplink data packet; and sending, by the second delivery node, the third uplink data packet to a destination device, where the second delivery node is deployed before the destination device.

According to a third aspect, an embodiment of the present disclosure provides a service node, where the service node is a second service node, and the second service node includes:

a receiving module, configured to receive a first uplink data packet sent by a first service node, where the first uplink data packet carries service node information corresponding to a service chain determined by a first delivery node, the first service node is a previous-hop service node, adjacent to the second service node, in the service chain, and the first delivery node is an uplink ingress delivery node of the service chain;

a service processing module, configured to perform service processing on the first uplink data packet, to obtain a second uplink data packet;

a decapsulation module, configured to: delete the service node information from the second uplink data packet, to obtain a third uplink data packet, when the second service node determines, according to the service node information, that the second service node is the last service node in an uplink direction of the service chain; and a sending module, configured to send the third uplink data packet to a second delivery node, where the second delivery node is an uplink egress delivery node of the service chain.

According to a fourth aspect, the present disclosure provides a delivery node, where the delivery node is a second delivery node, and the second delivery node includes:

a receiving module, configured to receive a third uplink data packet sent by a second service node, where the second service node is the last service node in an uplink direction of a service chain determined by a first delivery node, the second delivery node is an uplink egress delivery node of the service chain, and the third uplink data packet is obtained after the second service node receives a first uplink data packet sent by a first service node, performs service processing on the first uplink data packet to obtain a second uplink data packet, and deletes service node information of the service chain from the second uplink data packet; and a sending module, configured to send the third uplink data packet to a destination device, where the second delivery node is deployed before the destination device.

The embodiments of the present disclosure have the following advantages:

In the embodiments of the present disclosure, a first service node sends a first uplink data packet to a next-hop service node according to service node information corresponding to a service chain and enables the first uplink data packet to reach the last service node (that is, a second service node) in an uplink direction of the service chain. The last service node performs service processing on the first uplink data packet to obtain a second uplink data packet, deletes the service node information from the second uplink data packet, and sends a third uplink data packet obtained after the service node information is deleted to a second delivery node. The second delivery node, as an uplink egress delivery node of the service chain, receives the third uplink data packet and sends the third uplink data packet to a destination device. Because in a data packet processing system, when service processing is performed on an uplink data packet, a first delivery node and a second delivery node are respectively used as an uplink ingress delivery node and an uplink egress delivery node of the uplink data packet, that is, delivery nodes are designed in a distributed manner in a data packet center system, and two delivery nodes are used to perform ingress delivery and egress delivery on the uplink data packet, the uplink data packet needs to pass through each of the first delivery node and the second delivery node only once, which can improve the data packet processing efficiency.

BRIEF DESCRIPTION OF DRAWINGS

To describe the technical solutions in the embodiments of the present disclosure or in the prior art more clearly, the following briefly describes the accompanying drawings for describing the embodiments or the prior art.

FIG. 9-*a* is a schematic diagram of an uplink data packet processing process;

FIG. 9-*b* is a schematic diagram of a downlink data packet processing process;

FIG. 11-*a* is a schematic structural diagram of a service node according to an embodiment of the present disclosure;

FIG. 11-*b* is a schematic structural diagram of another service node according to an embodiment of the present disclosure;

FIG. 11-*c* is a schematic structural diagram of another service node according to an embodiment of the present disclosure;

FIG. 11-*d* is a schematic structural diagram of another service node according to an embodiment of the present disclosure;

FIG. 11-*e* is a schematic structural diagram of another service node according to an embodiment of the present disclosure;

FIG. 12-*a* is a schematic structural diagram of a delivery node according to an embodiment of the present disclosure;

FIG. 12-*b* is a schematic structural diagram of another delivery node according to an embodiment of the present disclosure;

FIG. 12-*c* is a schematic structural diagram of another delivery node according to an embodiment of the present disclosure;

FIG. 13 is a schematic structural diagram of another service node according to an embodiment of the present disclosure;

DESCRIPTION OF EMBODIMENTS

Embodiments of the present disclosure provide a data packet processing method, a delivery node, and a service node, to improve the data packet processing efficiency.

To make the disclosure objectives, features, and advantages of the present disclosure clearer and more comprehensible, the following clearly describes the technical solutions in the embodiments of the present disclosure with reference to the accompanying drawings in the embodiments of the present disclosure.

In the specification, claims, and accompanying drawings of the present disclosure, the terms "first", "second", and so on are intended to distinguish between similar objects but are not intended to indicate specific order or a sequence. It should be understood that the terms used in this way are interchangeable in proper circumstances, and are merely distinguishing manners that are used when objects of a same attribute are described in the embodiments that describe the present disclosure. Moreover, the terms "include", "contain" and any other variants mean to cover the non-exclusive inclusion, so that a process, method, system, product, or device that includes a list of units is not necessarily limited to those units, but may include other units not expressly listed or inherent to such a process, method, system, product, or device.

The embodiments of the present disclosure are described in detail in the following.

Figure 1:
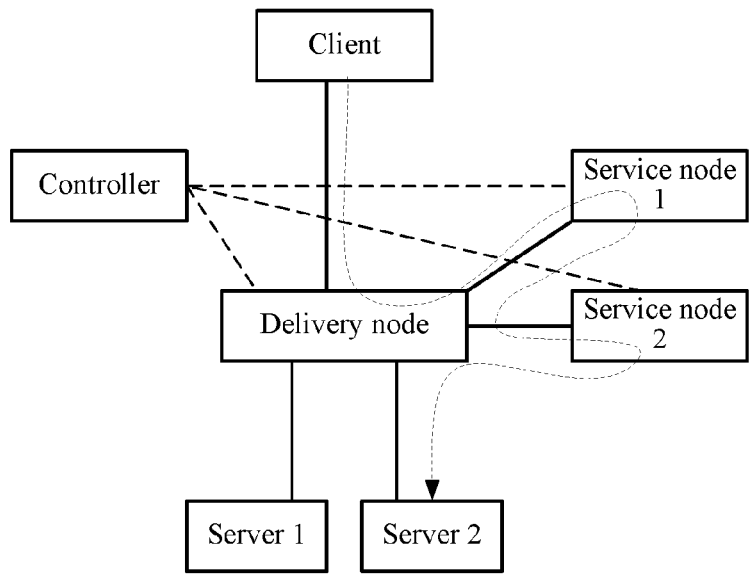
FIG. 1 is a schematic diagram of a data packet processing process in the prior art.
Figure 2:
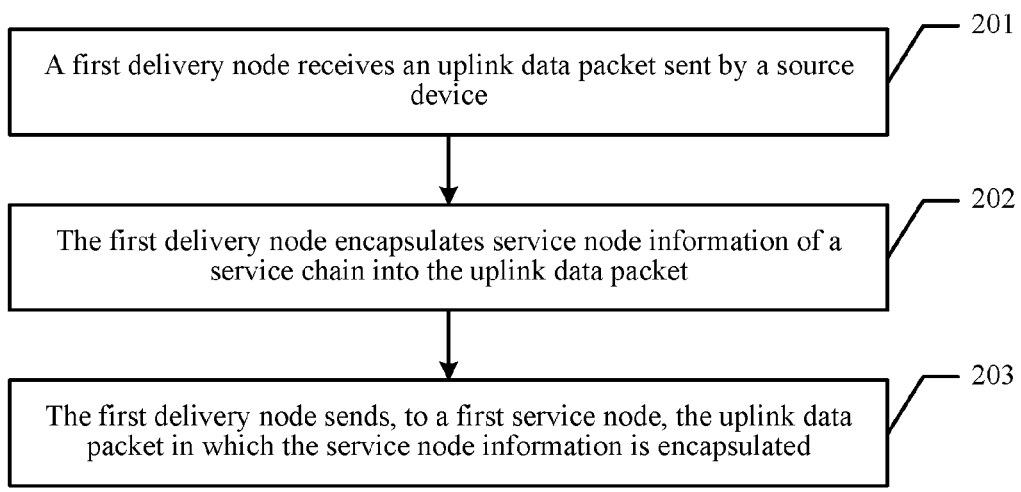
FIG. 2 is a schematic flowchart of a data packet processing method according to an embodiment of the present disclosure.

An embodiment of a data packet processing method in the present disclosure may be applied to a data packet processing system. As shown in FIG. 2, a data packet processing method provided in an embodiment of the present disclosure may include:

201: A first delivery node receives an uplink data packet sent by a source device.

The first delivery node is an uplink ingress delivery node of a service chain corresponding to the uplink data packet, where the service chain includes multiple service nodes needing to perform service processing on the uplink data packet sequentially.

In this embodiment of the present disclosure, a controller may configure delivery nodes and service nodes in a centralized manner. When the data packet processing system includes multiple delivery nodes and multiple service nodes, the controller needs to configure all delivery nodes and service nodes in a centralized manner, and the controller, the delivery nodes, and the service nodes are in an interconnected basic network. The delivery node determines, according to a policy configured by the controller, which data packets need to be transmitted to the service nodes to be processed, and determines service nodes to which the data packets need to be transmitted to be processed. In some application scenarios of the present disclosure, the service node provided in this embodiment of the present disclosure may also be referred to as a value-added service node.

In this embodiment of the present disclosure, as an uplink ingress delivery node, the first delivery node first receives the uplink data packet from the source device through an external network. In this embodiment of the present disclosure, the first delivery node is used as only an ingress delivery node of the uplink data packet. After the uplink data packet is sent from the first delivery node, the uplink data packet does not need to be returned to the first delivery node.

It should be noted that, in this embodiment of the present disclosure, an end actively initiating access is referred to as a "source device", and an accessed end is referred to as a "destination device". In order to distinguish between a data packet sent by the source device and a data packet sent by the destination device, the data packet sent by the source device is referred to as an "uplink data packet", an ingress delivery node delivering the uplink data packet is referred to as an "uplink ingress delivery node", an egress delivery node delivering the uplink data packet is referred to as an "uplink egress delivery node", the data packet sent by the destination device is referred to as a "downlink data packet", an ingress delivery node delivering the downlink data packet is referred to as a "downlink ingress delivery node", and an egress delivery node delivering the downlink data packet is referred to as a "downlink egress delivery node". Delivery performed by the first delivery node and a second delivery node on the uplink data packet and the downlink data packet forms delivery of flows in both directions. Service processing performed by a first service node, an intermediate service node, and a second service node on the uplink data packet and the downlink data packet forms service processing of flows in both directions. There may be zero intermediate service node (the intermediate service node does not exist) or one or more intermediate service nodes.

In addition, it should be noted that, multiple delivery nodes are deployed in the data packet processing system provided in this embodiment of the present disclosure. Two delivery nodes of the multiple delivery nodes cooperate with each other to implement delivery on a data packet. In this embodiment of the present disclosure, a delivery node receiving an uplink data packet sent by a source device is referred to as a "first delivery node", and an egress delivery node cooperating with the first delivery node to implement delivery on the uplink data packet is referred to as a "second delivery node". For details, refer to the description of the second delivery node in subsequent embodiments. In addition, in this embodiment of the present disclosure, "first", "second", "third", and the like are used to distinguish between multiple delivery nodes in the data packet processing system, and "first", "second", and "third" do not represent a chronological or logical sequence. Similarly, in this embodiment, "first", "second", and "third" are used to distinguish between multiple service nodes in the data packet processing system, and "first", "second", "third", and the like do not represent a chronological or logical sequence.

In this embodiment of the present disclosure, the controller configures a delivery policy in the ingress delivery node, where the delivery policy includes which delivery node delivers a data packet, and includes a service chain corresponding to the data packet. After receiving the uplink data packet from the source device, the first delivery node may determine, according to the delivery policy configured by the controller, a service chain that the uplink data packet needs to enter. The uplink data packet enters, through the ingress delivery node, a service chain determined by the first delivery node. After each service node in the service chain performs service processing on the data packet, the data packet flows out from the service chain to reach an egress delivery node. A data packet in each direction needs to pass through an ingress delivery node and an egress delivery node only once, and does not need to pass through one delivery node repeatedly for multiple times; therefore, this embodiment of the present disclosure can improve the data packet processing efficiency.

Figure 3:
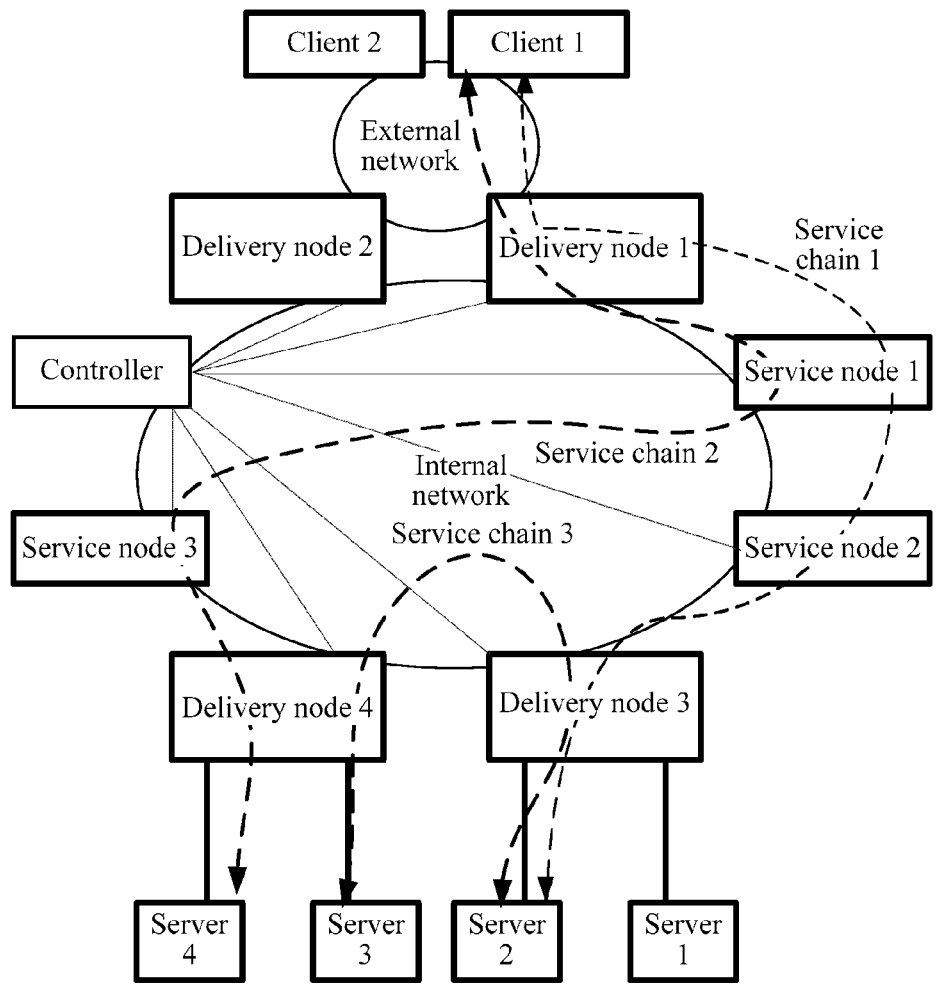
FIG. 3 is a schematic diagram of an implementation manner in which a controller configures a service chain according to an embodiment of the present disclosure.

Referring to a schematic diagram, shown in FIG. 3, of an implementation manner in which a controller configures a service chain, a data center network includes a controller, delivery node 1, delivery node 2, delivery node 3, delivery node 4, service node 1, service node 2, and service node 3. The delivery node 3 is deployed before server 1 and server 2 and the delivery node 4 is deployed before server 3 and server 4. The controller configures three service chains according to requirements of service processing, where the three service chains are respectively service chain 1, service chain 2, and service chain 3. Using implementation of the service chain 1 as an example for description, in a process in which a client 1 initiates access to the server 2, the client 1 is used as a source device, the server 2 is used as a destination device, the delivery node 1 is used as an uplink ingress delivery node, the delivery node 3 is used as an uplink egress delivery node, and a service chain obtained through matching by the delivery node 1 for an uplink data packet sent by the client 1 is the service chain 1. The service node 1 and the service node 2 need to perform service processing on the uplink data packet sequentially. For a downlink data packet sent by the server 2, the delivery node 3 is used as a downlink ingress delivery node, the service node 2 and the service node 1 need to perform service processing on the downlink data packet sequentially, and the delivery node 2 is used as a downlink egress delivery node. Similarly, for the service chain 2, in a process in which the client 1 initiates access to the server 4, an uplink data packet needs to pass through the delivery node 1, the service node 1, the service node 3, and the delivery node 4 sequentially, and reaches the server 4. For the service chain 3, in an operation of switching between the server 2 and the server 3, the service chain 3 is obtained through matching for an uplink data packet sent by the server 2.

For example, for a data packet entering the delivery node 1, if the data packet satisfies a delivery policy configured on the delivery node 1, the data packet is forwarded to a service chain corresponding to the delivery policy to undergo service processing. For example, for a policy Policy1, a corresponding service chain 1 is the service node 1 to the service node 2, that is, an uplink data packet hitting the Policy1 is sent by the delivery node 1 to the service node 1 to undergo service processing, and then is sent to the service node 2 to undergo service processing, and a corresponding downlink data packet is first sent to the service node 2 to undergo service processing, and then is sent to the service node 1 to undergo service processing. If a policy Policy2 is hit, a corresponding service chain 2 is the service node 1 to the service node 3, that is, an uplink data packet hitting the Policy2 is sent by the delivery node 1 to the service node 1 to undergo service processing, and then is sent to the service node 3 to undergo service processing, and a corresponding downlink data packet is first sent to the service node 3 to undergo service processing, and then is sent to the service node 1 to undergo service processing.

In some embodiments of the present disclosure, the source device may be a client and the destination device may be a server, for example, the client 1 and the server 2 described in FIG. 3. The source device may be a server and the destination device may be a client, for example, the server 4 and the client 1 described in FIG. 3. In addition, for internal mutual access in the data packet processing system, both the source device and the destination device may be servers, for example, the server 2 and the server 3 described in FIG. 3. In an actual application of the data packet processing system, a network is relatively complex and a Server may be deployed on a virtual machine. In this case, a delivery node associated with the Server is generally a virtual switch, where the switch faces a network interface of the Server to the south and faces a network interface of an external network of the data packet processing system to the north, and multiple delivery nodes are deployed in the data packet processing system.

202: The first delivery node encapsulates service node information of the service chain into the uplink data packet.

In this embodiment of the present disclosure, after the first delivery node determines, according to the delivery policy, a service chain that the uplink data packet needs to enter, the first delivery node encapsulates service node information of the determined service chain into the uplink data packet. The service node information of the service chain refers to service node information of multiple service nodes included in the service chain. The service node information may refer to an Internet Protocol (IP) address of a service node. In this embodiment of the present disclosure, the service node information may also be a specific identifier of a service node, for example, the service node information may be a device index of the service node.

In some embodiments of the present disclosure, when the service node information is an IP address, the encapsulating, by the first delivery node, service node information of a service chain into the uplink data packet in step 202 may include the following step:

encapsulating, by the first delivery node, IP addresses of all service nodes in the service chain into the uplink data packet sequentially according to a service processing sequence.

When an IP address of a service node is used to represent service node information, after the first delivery node determines a service chain, the first delivery node may encapsulate IP addresses of all service nodes in the service chain into the uplink data packet, and the multiple IP addresses encapsulated into the uplink data packet by the first delivery node may form routing information of the service chain, to indicate how a previous-hop service node in the service chain forwards a data packet to a next-hop service node.

In some other embodiments of the present disclosure, when the service node information is a device index of a service node, the encapsulating, by the first delivery node, service node information of a service chain into the uplink data packet in step 202 may include the following step:

encapsulating, by the first delivery node, device indexes of all service nodes in the service chain into the uplink data packet sequentially according to a service processing sequence.

When a device index of a service node is used to represent service node information, after the first delivery node determines a service chain, the first delivery node may encapsulate device indexes of all service nodes in the service chain into the uplink data packet, and the multiple device indexes encapsulated into the uplink data packet by the first delivery node may be used to indicate which service nodes need to perform service processing on the uplink data packet, and a previous-hop service node in the service chain may also determine, according to a mapping relationship between a device index and an IP address, a next-hop service node to which the uplink data packet needs to be forwarded.

In some embodiments of the present disclosure, the first delivery node encapsulates the service node information into the uplink data packet, for example, the first delivery node may encapsulate the service node information into a packet header of the uplink data packet. The first delivery node may modify an IP option field of the uplink data packet, and add the service node information to the field. It should be noted that, in this embodiment of the present disclosure, the service node information encapsulated into the uplink data packet by the first delivery node is for being parsed and used by service nodes; therefore, the first delivery node only needs to encapsulate the service node information in a manner pre-agreed between the first delivery node and the service nodes.

203: The first delivery node sends, to a first service node, the uplink data packet in which the service node information is encapsulated.

The first service node is the first service node performing service processing on the uplink data packet in the service chain.

In this embodiment of the present disclosure, after determining which service chain forwards the uplink data packet, the first delivery node encapsulates service node information of the determined service chain into the uplink data packet, and sends, to the first service node of the service chain, the uplink data packet in which the service node information of the service chain is encapsulated.

In this embodiment of the present disclosure, after the uplink data packet enters the service chain through the uplink ingress delivery node (that is, the first delivery node) and reaches the first service node, the uplink data packet is not returned to the first delivery node, that is, a data packet in one flow direction needs to pass through the delivery node only once. When all service nodes in the service chain perform service processing on the uplink data packet, the uplink data packet flows out from the service chain and reaches an egress delivery node. A data packet in each direction needs to pass through the ingress delivery node and the egress delivery node only once, which can improve the data packet processing efficiency.

The foregoing embodiment describes an uplink data packet delivering process, and a downlink data packet delivering process is described in the following. In this embodiment of the present disclosure, a data packet processing process may be: processing of data flows in both directions. Using a web service based on the Hypertext Transfer Protocol (HTTP) as an example, for each access process, there are data flows in both directions: an uplink data flow from a Client to a Server, and a downlink data flow from the Server to the Client. For some application scenarios, for example, an active mode of the File Transfer Protocol (FTP), there may be a case in which the Server first initiates an uplink data flow to the Client, and the Client returns a downlink data flow to the Server.

In this embodiment of the present disclosure, for a method used by the first delivery node to deliver a downlink data packet, refer to the description in the following embodiment.

In some embodiments of the present disclosure, after step 203, the method may further include the following steps:

A1: The first delivery node receives a downlink data packet sent by the first service node, where the downlink data packet carries the service node information of the service chain. In this case, the first delivery node is a downlink egress delivery node delivering the downlink data packet.

A2: The first delivery node deletes the service node information from the downlink data packet.

A3: The first delivery node sends the downlink data packet from which the service node information is deleted to the source device.

The downlink data packet is a data packet that is returned by the destination device according to the uplink data packet. A forwarding process of the downlink data packet is just opposite to that of the uplink data packet. Symmetric processing is performed on the downlink data packet in the service chain according to a service processing process opposite to that of the uplink data packet. When the downlink data packet reaches the first service node, the first service node sends the downlink data packet to the first delivery node. Because when the downlink data packet enters the service chain and reaches the first service node processing the downlink data packet, the service node encapsulates service node information into the downlink data packet. After the first delivery node receives the downlink data packet, the first delivery node needs to delete the service node information, and sends a data packet to the source node after deleting the service node information, so as to implement symmetric processing on data packets in both directions. The downlink data packet flows out from the service chain, and reaches the downlink egress delivery node (that is, the first delivery node); therefore, a data packet in each direction needs to pass through the egress delivery node only once, which can improve the data packet processing efficiency. In addition, in the data packet processing system provided in this embodiment of the present disclosure, automatic association processing may be implemented on data flows in both directions, which reduces the configuration complexity of the controller and improves the system processing performance.

As can be known from the description of the present disclosure in the foregoing embodiment, a source device sends an uplink data packet to a first delivery node, the first delivery node encapsulates service node information of a service chain into the uplink data packet, and then, the first delivery node sends, to a first service node in the service chain, the uplink data packet in which the service node information is encapsulated. The first service node sends a first uplink data packet to a next-hop service node according to the service node information corresponding to the service chain, and enables the first uplink data packet to reach the last service node (that is, a second service node) in an uplink direction of the service chain. The last service node performs service processing on the first uplink data packet to obtain a second uplink data packet, deletes the service node information from the second uplink data packet, and sends a third uplink data packet obtained after the service node information is deleted to a second delivery node. The second delivery node, as an uplink egress delivery node of the service chain, receives the third uplink data packet and sends the third uplink data packet to a destination device. Because in a data packet processing system, when service processing is performed on an uplink data packet, a first delivery node and a second delivery node are respectively used as an uplink ingress delivery node and an uplink egress delivery node of the uplink data packet, that is, delivery nodes are designed in a distributed manner in a data packet center system, and two delivery nodes are used to perform ingress delivery and egress delivery on the uplink data packet, the uplink data packet needs to pass through each of the first delivery node and the second delivery node only once, which can improve the data packet processing efficiency.

Figure 4:
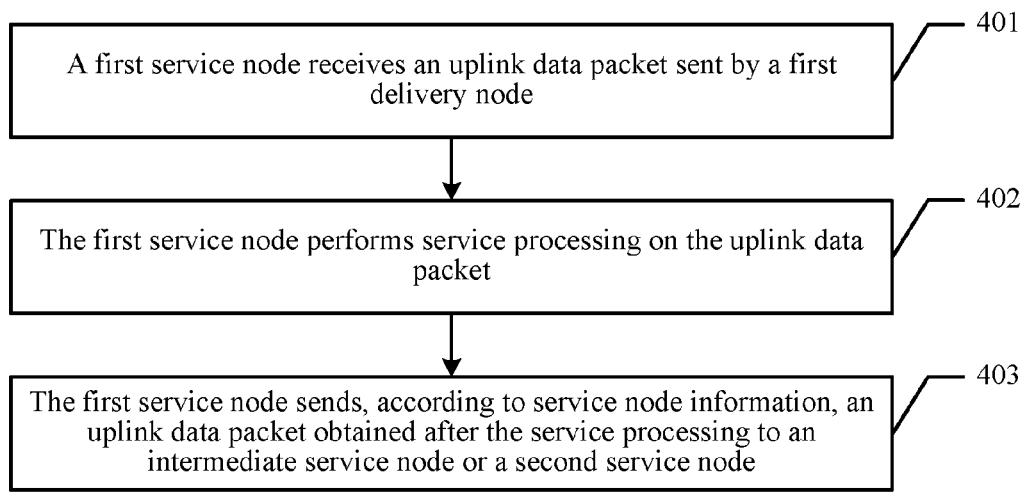
FIG. 4 is a schematic flowchart of another data packet processing method according to an embodiment of the present disclosure.

The foregoing embodiment describes, from the perspective of a first delivery node in a data packet processing system, the data packet processing method provided in the embodiments of the present disclosure, and the following describes, from the perspective of a first service node, the data packet processing method provided in the embodiments of the present disclosure. As shown in FIG. 4, a data packet processing method provided in an embodiment of the present disclosure may include:

401: A first service node receives an uplink data packet sent by a first delivery node.

The uplink data packet carries service node information of a service chain determined by the first delivery node.

In this embodiment of the present disclosure, in a data packet processing system, the first delivery node delivers the uplink data packet to the first service node performing service processing on the uplink data packet in the service chain determined by the first delivery node. The first delivery node and the first service node are in a same interconnected internal network. The first service node first receives the uplink data packet sent by the first delivery node. Because the first delivery node adds the service node information to the uplink data packet, the first service node may acquire the service node information by parsing the uplink data packet. The service node information may refer to an IP address of a service node. In this embodiment of the present disclosure, the service node information may also refer to a specific identifier of a service node, for example, the service node information may be a device index of the service node.

402: The first service node performs service processing on the uplink data packet.

In this embodiment of the present disclosure, after the first service node receives the uplink data packet, the first service node performs service processing on the uplink data packet. In addition, in the data packet processing system provided in this embodiment of the present disclosure, each service node included in the service chain needs to perform service processing on a data packet, but content of service processing performed by different service nodes on the data packet is different. For example, some service nodes perform anti-virus (AV) processing, and some service nodes perform intrusion prevention system (IPS) processing. When a controller configures service nodes, each service chain includes service nodes, corresponding service processing that needs to be performed by the service nodes, a sequence of service processing performed by the service nodes, and the like. In addition, in different application scenarios, the service nodes in the service chain may separately perform various service processing, and service processing performed by a service node on a data packet may be implemented with reference to a specific scenario, which is merely described herein.

403: The first service node sends, according to service node information, an uplink data packet obtained after the service processing to an intermediate service node or a second service node.

The intermediate service node is a next-hop service node adjacent to the first service node in the service chain. If there is no intermediate service node between the first service node and the second service node in the service chain, the first service node directly sends the uplink data packet to the second service node.

In this embodiment of the present disclosure, after the first service node completes processing the uplink data packet according to a service mode of the service node, the first service node may send the uplink data packet obtained after the service processing to the intermediate service node according to the service node information. Because the first service node is the first service node performing service processing on the uplink data packet in the service chain, after the first service node completes performing service processing on the data packet, the first service node needs to send the uplink data packet to a next-hop service node according to the service node information of the service chain. The intermediate service node is a next-hop service node adjacent to the first service node in the service chain. The intermediate service node performs service processing on the uplink data packet according to a service mode of the service node, and continues to send the uplink data packet to a next-hop service node of the intermediate service node according to the service node information. In addition, in some embodiments of the present disclosure, each service node may further determine, according to the service node information carried in the uplink data packet, whether the service node is the last service node performing service processing on the uplink data packet in the service chain determined by the first delivery node. As long as the service node is not the last service node performing service processing on the uplink data packet in the service chain, the service node needs to continue to send the uplink data packet to a next-hop service node of the service node according to the service node.

As can be known from the foregoing description of the service node information, if the service node information is an IP address of a service node, the first service node may directly forward the uplink data packet to the intermediate service node according to the IP address. When the service node information is a device index of a service node, after the performing, by the first service node, service processing on the uplink data packet in step 402, the data packet processing method provided in this embodiment of the present disclosure may further include the following step:

querying, by the first service node according to a mapping relationship table set by the controller, an IP address corresponding to a device index of the intermediate service node.

That is, when the service node information encapsulated by the first delivery node in the uplink data packet is not the IP address of the service node, but is a device index value of the service node, after the first service node parses the uplink data packet, the first service node needs to query, according to device index information, the mapping relationship table configured by the controller, to acquire the IP address corresponding to the intermediate service node, so that the first service node may send the uplink data packet to the intermediate service node according to the IP address obtained by means of querying.

The foregoing embodiment describes an implementation process in which the first service node performs service processing on the uplink data packet, and the following describes a process of performing service processing on a downlink data packet. In this embodiment of the present disclosure, a data packet processing process may be processing of data flows in both directions. Using a Web service based on the HTTP as an example, for each access process, there is a problem of data flows in both directions: an uplink data flow from a Client to a Server, and a downlink data flow from the Server to the Client. For some applications, for example, an active mode of the FTP, there may be a case in which the Server first initiates an uplink data flow to the Client, and the Client returns a downlink data flow to the Server. Due to requirements of service processing on a service node, symmetric processing generally needs to be performed on data flows in both directions in the service chain.

In this embodiment of the present disclosure, for a method used by the first service node to perform service processing on a downlink data packet, refer to the description in the following embodiment. In some embodiments of the present disclosure, after the sending, by the first service node, an uplink data packet obtained after service processing, to an intermediate service node according to service node information in step 403, the method may further include the following steps:

B1: The first service node receives a downlink data packet sent by the intermediate service node, where the downlink data packet carries the service node information of the service chain determined by the first delivery node.

B2: The first service node performs service processing on the downlink data packet.

B3: When the first service node determines, according to the service node information, that the first service node is the last service node in an uplink direction of the service chain, the first service node sends a downlink data packet obtained after the service processing to the first delivery node, where the first delivery node is a downlink egress delivery node delivering the data packet.

The downlink data packet is a data packet that is returned by a destination device according to the uplink data packet. A process of forwarding the downlink data packet is opposite to a process of forwarding the uplink data packet. Symmetric processing is performed on the downlink data packet in the service chain according to a service processing process opposite to that of the uplink data packet. After the downlink data packet reaches the intermediate service node, the first service node is used as a next-hop service node of the intermediate service node in the service chain when service processing is performed on the downlink data packet, the intermediate service node sends the downlink data packet to the first service node. In step B1, if there is no intermediate service node between the first service node and the second service node in the service chain, the first service node may receive the downlink data packet from the second service node. Because when the downlink data packet enters the service chain and reaches the first service node performing service processing on the downlink data packet, the service node encapsulates the service node information into the downlink data packet, and the intermediate service node may send the downlink data packet to the first service node according to the service node information.

As can be known from the description of the present disclosure in the foregoing embodiment, a source device sends an uplink data packet to a first delivery node, the first delivery node encapsulates service node information of a service chain into the uplink data packet, and then, the first delivery node sends, to a first service node in the service chain, the uplink data packet in which the service node information is encapsulated. The first service node sends a first uplink data packet to a next-hop service node according to the service node information corresponding to the service chain, and enables the first uplink data packet to reach the last service node (that is, a second service node) in an uplink direction of the service chain. The last service node performs service processing on the first uplink data packet to obtain a second uplink data packet, deletes the service node information from the second uplink data packet, and sends a third uplink data packet obtained after the service node information is deleted to a second delivery node. The second delivery node, as an uplink egress delivery node of the service chain, receives the third uplink data packet and sends the third uplink data packet to a destination device. Because in a data packet processing system, when service processing is performed on an uplink data packet, a first delivery node and a second delivery node are respectively used as an uplink ingress delivery node and an uplink egress delivery node of the uplink data packet, that is, delivery nodes are designed in a distributed manner in a data packet center system, and two delivery nodes are used to perform ingress delivery and egress delivery on the uplink data packet, the uplink data packet needs to pass through each of the first delivery node and the second delivery node only once, which can improve the data packet processing efficiency.

The foregoing embodiment describes, from the perspective of a first service node in a data packet processing system, the data packet processing method provided in the embodiments of the present disclosure. If there is an intermediate service node between the first service node and a second service node in a service chain, the intermediate service node receives an uplink data packet sent by the first service node. A data packet processing method that may be performed by the intermediate service node may be as follows:

First, the intermediate service node receives the first uplink data packet sent by the first service node.

The first uplink data packet carries the service node information corresponding to the service chain determined by the first delivery node, the first service node is a previous-hop service node adjacent to the intermediate service node in the service chain, and the first delivery node is an uplink ingress delivery node of the service chain.

In this embodiment of the present disclosure, for an uplink direction of a data packet, if there is an intermediate service node, the intermediate service node is a previous-hop service node, adjacent to the second service node, in the service chain. After performing service processing on the uplink data packet according to a service mode of the service node, the first service node sends the first uplink data packet to the intermediate service node. The intermediate service node receives the first uplink data packet sent by the first service node. Because the first delivery node encapsulates the service node information in the first uplink data packet, the intermediate service node may acquire the service node information from the first uplink data packet by parsing the first uplink data packet.

Specifically, the service node information may refer to an IP address of a service node. In this embodiment of the present disclosure, the service node information may also refer to a specific identifier of a service node, for example, the service node information may be a device index of the service node.

Second, the intermediate service node performs service processing on the first uplink data packet, to obtain the first uplink data packet that has undergone the service processing.

In this embodiment of the present disclosure, after the intermediate service node receives the uplink data packet sent by the first service node, the intermediate service node may perform service processing on the first uplink data packet.

In this embodiment of the present disclosure, after the intermediate service node receives the first uplink data packet, the intermediate service node performs service processing on the first uplink data packet. In addition, in the data packet processing system provided in this embodiment of the present disclosure, each service node included in the service chain needs to perform service processing on a data packet, but content of service processing performed by different service nodes on the data packet is different. For example, some service nodes perform anti-virus processing, and some service nodes perform intrusion prevention system processing. When the controller configures service nodes, each service chain includes service nodes, corresponding service processing that needs to be performed by the service nodes, a sequence of service processing performed by the service nodes, and the like. In addition, in different application scenarios, the service nodes in the service chain may separately perform various service processing, and service processing performed by a service node on a data packet may be implemented with reference to a specific scenario, which is merely described herein.

Finally, the intermediate service node sends the first uplink data packet obtained after the service processing to the second service node.

In this embodiment of the present disclosure, after receiving the uplink data packet from a previous-hop service node, each service node in the data packet processing system may further determine, according to the service node information carried in the uplink data packet, whether the service node is the last service node performing service processing on the uplink data packet in the service chain determined by the first delivery node. As long as the service node is not the last service node performing service processing on the uplink data packet in the service chain, the service node needs to continue to send the uplink data packet to a next-hop service node of the service node according to the service node information. After each intermediate service node parses out the service node information from the uplink data packet, the intermediate service node also needs to determine, according to the service node information, whether the service node is the last service node in an uplink direction of the service chain. In this embodiment of the present disclosure, only the second service node determines, according to the service node information, that the service node is the last service node performing service processing on the uplink data packet in the service chain, and for the second service node, there is no next-hop service node of the second service node in the service chain.

Based on the foregoing data packet processing method performed by the first delivery node and the first service node, as can be known from the description of the present disclosure in the foregoing embodiment, a first service node sends a first uplink data packet to a next-hop service node according to service node information corresponding to a service chain, and enables the first uplink data packet to reach the last service node (that is, a second service node) in an uplink direction of the service chain. The last service node performs service processing on the first uplink data packet to obtain a second uplink data packet, deletes the service node information from the second uplink data packet, and sends a third uplink data packet obtained after the service node information is deleted to a second delivery node. The second delivery node, as an uplink egress delivery node of the service chain, receives the third uplink data packet and sends the third uplink data packet to a destination device.

As can be known from the description of the intermediate service node, the intermediate service node performs service processing on the received uplink data packet. Then, the intermediate service node sends the uplink data packet to a next-hop service node of the intermediate service according to the service node information corresponding to the service chain. Because in a data packet processing system, when service processing is performed on an uplink data packet, a first delivery node and a second delivery node are respectively used as an uplink ingress delivery node and an uplink egress delivery node of the uplink data packet, that is, delivery nodes are designed in a distributed manner in a data packet center system, and two delivery nodes are used to perform ingress delivery and egress delivery on the uplink data packet, the uplink data packet needs to pass through each of the first delivery node and the second delivery node only once, which can improve the data packet processing efficiency.

In some other application scenarios of the present disclosure, if there is no intermediate service node between the first service node and the second service node in the service chain, that is, the first service processing node sends the uplink data packet to the second service node directly after processing the uplink data packet, in this implementation scenario, the data packet processing method provided in the embodiments of the present disclosure is described from the perspective of the second service node.

Figure 5:
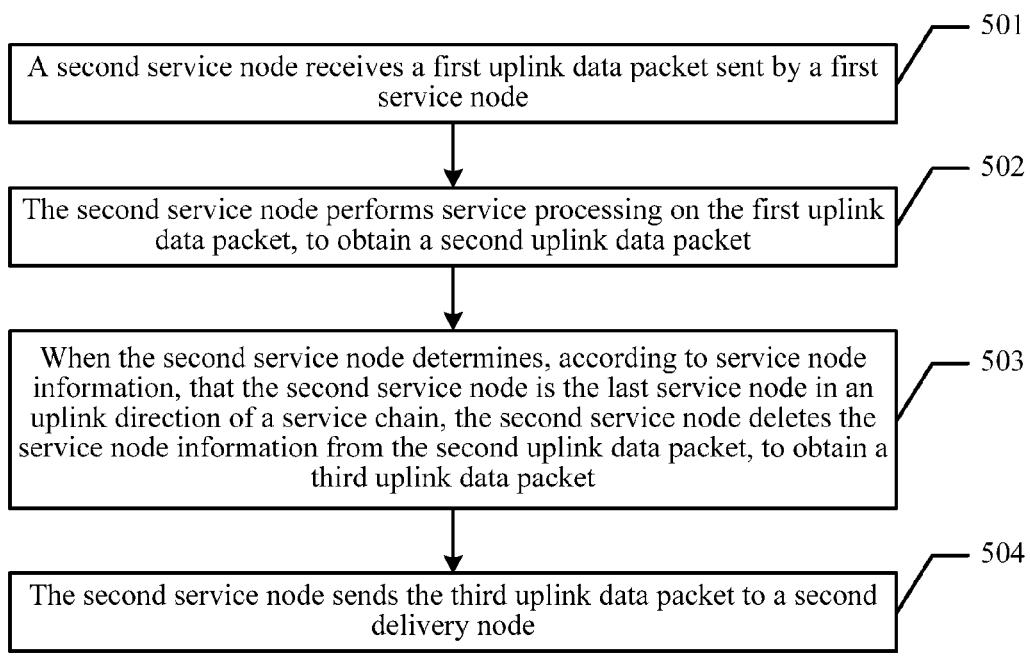
FIG. 5 is a schematic flowchart of another data packet processing method according to an embodiment of the present disclosure.

As shown in FIG. 5, a data packet processing method provided in an embodiment of the present disclosure may include:

501: A second service node receives a first uplink data packet sent by a first service node.

The first uplink data packet carries service node information corresponding to a service chain determined by a first delivery node, the first service node is a previous-hop service node, adjacent to the second service node, in the service chain, and the first delivery node is an uplink ingress delivery node of the service chain.

In this embodiment of the present disclosure, for an uplink direction of a data packet, the first service node is a previous-hop service node, adjacent to the second service node, in the service chain. After performing service processing on the uplink data packet according to a service mode of the first service node, the first service node sends the first uplink data packet to the second service node. The second service node receives the first uplink data packet sent by the first service node. Because the first delivery node encapsulates the service node information in the first uplink data packet, the second service node may acquire the service node information from the first uplink data packet by parsing the first uplink data packet.

Specifically, the service node information may refer to an IP address of a service node. In this embodiment of the present disclosure, the service node information may also refer to a specific identifier of a service node, for example, the service node information may be a device index of the service node.

502: The second service node performs service processing on the first uplink data packet, to obtain a second uplink data packet.

In this embodiment of the present disclosure, after the second service node receives the first uplink data packet sent by the first service node, the second service node may perform service processing on the first uplink data packet.

In this embodiment of the present disclosure, after the second service node receives the first uplink data packet, the second service node performs service processing on the first uplink data packet. For a specific service processing manner, refer to the description in the foregoing embodiment. In a data packet processing system provided in this embodiment of the present disclosure, each service node included in the service chain needs to perform service processing on a data packet, but content of service processing performed by different service nodes on the data packet is different.

503: When the second service node determines, according to service node information, that the second service node is the last service node in an uplink direction of a service chain, the second service node deletes the service node information from the second uplink data packet, to obtain a third uplink data packet.

In this embodiment of the present disclosure, after receiving the uplink data packet from a previous-hop service node, each service node in the data packet processing system may further determine, according to the service node information carried in the uplink data packet, whether the service node is the last service node performing service processing on the uplink data packet in the service chain determined by the first delivery node. As long as the service node is not the last service node performing service processing on the uplink data packet in the service chain, the service node needs to continue to send the uplink data packet to a next-hop service node of the service node according to the service node information. Similarly, after the second service node parses out the service node information from the uplink data packet, the second service node also needs to determine, according to the service node information, whether the service node is the last service node in the uplink direction of the service chain. In this embodiment of the present disclosure, the second service node determines, according to the service node information, that the service node is the last service node performing service processing on the uplink data packet in the service chain, and for the second service node, there is no next-hop service node of the second service node in the service chain.

In this embodiment of the present disclosure, the second service node determines that the service node is the last service node in the uplink direction of the service chain, and for the second service node, there is no next-hop service node that needs to continue to perform service processing on the second uplink data packet in the service chain. Therefore, after performing service processing on the second uplink data packet, the second service node may delete the service node information from the second uplink data packet, to obtain a third uplink data packet.

504: The second service node sends the third uplink data packet to a second delivery node.

The second delivery node is an uplink egress delivery node of the service chain.

In this embodiment of the present disclosure, the second service node is used as the last service node in the uplink direction of the service chain. When the second service node obtains the third uplink data packet after deleting the service node information from the second uplink data packet, the third uplink data packet flows out from the service chain. The second service node sends the third uplink data packet to the uplink egress delivery node. In this embodiment of the present disclosure, the uplink egress delivery node delivering the third uplink data packet is defined as "the second delivery node".

In some embodiments of the present disclosure, before the sending, by the second service node, the third uplink data packet to a second delivery node in step 504, the data packet processing method provided in this embodiment of the present disclosure may further include the following step:

querying, by the second service node, an uplink egress delivery node of the third uplink data packet according to a bidirectional flow table.

In this application scenario, the second service node queries the bidirectional flow table. An obtained result may include the following two cases: in a first case, the uplink egress delivery node of the third uplink data packet may be obtained by means of querying by using the bidirectional flow table; in a second case, the uplink egress delivery node of the third uplink data packet is not obtained by means of querying by using the bidirectional flow table. For the second case, if the uplink egress delivery node is not obtained by means of querying, the sending, by the second service node, the third uplink data packet to a second delivery node in step 504 is specifically: sending, by the second service node, the third uplink data packet to the second delivery node according to a forwarding route. For the first case, if it is obtained by means of querying that the uplink egress delivery node is the second delivery node, the sending, by the second service node, the third uplink data packet to a second delivery node in step 504 is specifically: sending, by the second service node, the third uplink data packet to the second delivery node according to the bidirectional flow table.

That is, in some embodiments of the present disclosure, the second service node is used as the last service node in the uplink direction of the service chain. The second service node may establish a bidirectional flow table, to record a destination address of data packet forwarding. Before the second service node sends the third uplink data packet from the service chain, the second service node may query the bidirectional flow table. If the second service node obtains the uplink egress delivery node by querying the bidirectional flow table, the second service node may forward the third uplink data packet to the uplink egress delivery node (that is, the second delivery node defined in this embodiment of the present disclosure) according to the bidirectional flow table. If the second service node does not obtain the uplink egress delivery node by querying the bidirectional flow table, the second service node sends, according to a forwarding route, the third uplink data packet to a delivery node (the second delivery node connected to the destination device in this embodiment of the present disclosure) deployed before the destination device. For the third uplink data packet sent for the first time in the service chain determined by the first delivery node, the second service node does not record delivery node information of an egress delivery node in the bidirectional flow table. When a first downlink data packet corresponding to the third uplink data packet that is sent for the first time reaches the second service node, the second service node may record egress delivery node information of the third uplink data packet. When the bidirectional flow table is queried for a subsequent uplink data packet, an egress delivery node of the uplink data packet may be obtained by means of querying, so as to forward the uplink data packet to the uplink egress delivery node according to the bidirectional flow table.

It should be noted that, in this embodiment of the present disclosure, the bidirectional flow table may include an uplink flow table and a downlink flow table, which are respectively used to record information about data packet flow directions in the uplink direction and a downlink direction of the service chain. The flow table may include quintuple information. For example, the flow table records a source IP address, a source port, a destination IP address, a destination port, and a transmission layer protocol number that are carried in a data packet. For the uplink direction of the service chain, the second service node saves a source IP address, a source port, and a destination IP address that are carried in the third uplink data packet into the downlink flow table, so that the second service node performs forwarding control by using the downlink flow table when the second service node processes a downlink data packet in the service chain. In addition, the foregoing delivery node information may refer to an IP address of a delivery node. For example, delivery node information of the second delivery node is an IP address of the second delivery node. In addition, the delivery node information may also refer to a specific identifier of the delivery node, for example, the delivery node information may be a device index of the delivery node.

It should be noted that, in some embodiments of the present disclosure, a manner in which a bidirectional flow table is established in the second service node to query the uplink egress delivery node of the third uplink data packet is merely an implementation manner in which the second service node sends the third uplink data packet. In some other embodiments of the present disclosure, before the sending, by the second service node, the third uplink data packet to a second delivery node in step 504, the data packet processing method provided in this embodiment of the present disclosure may further include the following step:

encapsulating, by the second service node, service node information of the second service node into the third uplink data packet.

In this implementation scenario, step 504 is specifically: sending, by the second service node to the second delivery node, the third uplink data packet in which the service node information of the second service node is encapsulated.

That is, in order that the first downlink data packet corresponding to the third uplink data packet can be sent to the second service node from an ingress delivery node of the first downlink data packet, the second service node may encapsulate the service node information of the second service node into the third uplink data packet. When the ingress delivery node of the first downlink data packet receives the third uplink data packet, the ingress delivery node of the first downlink data packet may record the service node information of the second service node, save the service node information into the bidirectional flow table established by the ingress delivery node of the first downlink data packet, so that the ingress delivery node of the first downlink data packet may send the first downlink data packet to the second service node according to the service node information of the second service node, which can implement automatic association processing of data flows in both directions, simplify configuration, and improve the processing performance of the data packet processing system. Specifically, the service node information of the second service node may refer to an IP address of the second service node. In this embodiment of the present disclosure, the service node information of the second service node may also refer to a specific identifier of the second service node, for example, the service node information of the second service node may be a device index of the second service node.

The foregoing embodiment describes an implementation process in which the second service node performs service processing on the third uplink data packet, and the following describes a process of performing service processing on a downlink data packet. In this embodiment of the present disclosure, a data packet processing process may be: processing of data flows in both directions. Using a web service based on the HTTP as an example, for each access process, there is a problem of data flows in both directions: an uplink data flow from a Client to a Server, and a downlink data flow from the Server to the Client. For some application scenarios, for example, an active mode of the FTP, there may be a case in which the Server first initiates an uplink data flow to the Client and the Client returns a downlink data flow to the Server. Due to requirements of service processing on a service node, symmetric processing generally needs to be performed on data flows in both directions in a service chain.

In this embodiment of the present disclosure, for a method used by the second service node to perform service processing on a first downlink data packet, refer to the description in the following embodiment. In some embodiments of the present disclosure, after the sending, by the second service node, the third uplink data packet to a second delivery node in step 504, the method may further include the following steps:

C1: The second service node receives a first downlink data packet sent by the second delivery node, where the second delivery node is a downlink ingress delivery node delivering the first downlink data packet.

C2: The second service node performs service processing on the first downlink data packet, to obtain a second downlink data packet.

C3: The second service node determines, according to a bidirectional flow table, that the second downlink data packet is a downlink data packet in the service chain.

C4: The second service node encapsulates the service node information of the service chain into the second downlink data packet, to obtain a third downlink data packet.

C5: The second service node sends the third downlink data packet to the first service node.

The first downlink data packet is a data packet that is returned by the destination device according to the third uplink data packet. A forwarding process of the first downlink data packet is just opposite to that of the first uplink data packet. Symmetric processing is performed on the first downlink data packet in the service chain according to a service processing process opposite to that of the first uplink data packet. When the first downlink data packet is sent to the second delivery node by the destination device, the second delivery node is used as a downlink ingress delivery node performing service processing on the downlink data packet in the service chain, and the second delivery node may deliver the first downlink data packet to the second service node. Because symmetric processing is performed on the uplink data packet and the downlink data packet in this embodiment of the present disclosure, in a process of processing the uplink data packet, the second service node is the last service node in the uplink direction of the service chain, and in a process of processing the downlink data packet, the second service node is the first service node in a downlink direction of the service chain.

After the second service node receives the first downlink data packet sent by the second delivery node, the second service node performs determining on the received first downlink data packet. The second service node determines, according to the bidirectional flow table, that the first downlink data packet is a downlink data packet in the service chain, that is, the second service node determines that the first downlink data packet received from the second delivery node is a downlink data packet whose flow direction is opposite to a flow direction of the first uplink data packet; therefore, opposite service processing of the first uplink data packet in the service chain needs to be performed on the first downlink data packet. Because the second service node is the first service node performing service processing on the downlink data packet, in order that the first downlink data packet can enter service nodes in the service chain sequentially to perform service processing, the second service node may encapsulate the service node information of the service chain determined by the first delivery node into the first downlink data packet, where the service node information of the service chain refers to service node information of multiple service nodes included in the service chain. Specifically, the service node information may refer to an IP address of a service node. In this embodiment of the present disclosure, the service node information may also refer to a specific identifier of the service node, for example, the service node information may be a device index of the service node. In a process of processing the downlink data packet, the first service node is used as a next-hop service node, adjacent to the second service node, in the service chain, and the second service node sends the third downlink data packet to the first service node.

In some embodiments of the present disclosure, after the determining, by the second service node according to a bidirectional flow table, that the second downlink data packet is a downlink data packet in the service chain in step C3, the method further includes:

saving, by the second service node, delivery node information of the second delivery node into the bidirectional flow table.

The bidirectional flow table established by the second service node may include an uplink flow table and a downlink flow table. After the third uplink data packet reaches the second service node, the second service node records information about the third uplink data packet in the downlink flow table. After receiving the first downlink data packet, the second service node may determine, according to the downlink flow table, that the first downlink data packet is a data packet whose flow direction is opposite to a flow direction of the third uplink data packet. After receiving the first downlink data packet, the second service node records, in the uplink flow table, the delivery node information of the second delivery node sending the first downlink data packet, so that the second service node may query the uplink flow table after receiving the third uplink data packet. The delivery node information of the second delivery node saved by the second service node may be an IP address of the second delivery node, or may be a specific identifier of the second delivery node, for example, a device index of the second delivery node.

As can be known from the description of the present disclosure in the foregoing embodiment, a first service node sends a first uplink data packet to a next-hop service node according to service node information corresponding to a service chain and enables the first uplink data packet to reach the last service node (that is, a second service node) in an uplink direction of the service chain. The last service node performs service processing on the first uplink data packet to obtain a second uplink data packet, deletes the service node information from the second uplink data packet, and sends a third uplink data packet obtained after the service node information is deleted to a second delivery node. The second delivery node, as an uplink egress delivery node of the service chain, receives the third uplink data packet and sends the third uplink data packet to a destination device. Because in a data packet processing system, when service processing is performed on an uplink data packet, a first delivery node and a second delivery node are respectively used as an uplink ingress delivery node and an uplink egress delivery node of the uplink data packet, that is, delivery nodes are designed in a distributed manner in a data packet center system, and two delivery nodes are used to perform ingress delivery and egress delivery on the uplink data packet, the uplink data packet needs to pass through each of the first delivery node and the second delivery node only once, which can improve the data packet processing efficiency.

Figure 6:
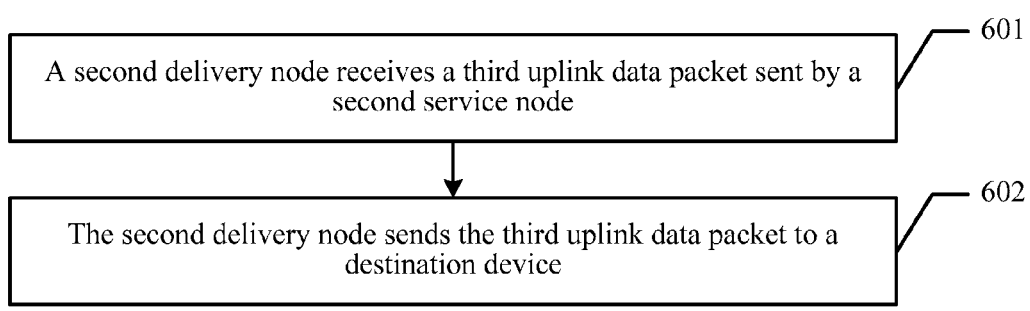
FIG. 6 is a schematic flowchart of another data packet processing method according to an embodiment of the present disclosure.

The foregoing embodiment describes, from the perspective of a second service node in a data packet processing system, the data packet processing method provided in the embodiments of the present disclosure, and the following describes, from the perspective of a second delivery node, the data packet processing method provided in the embodiments of the present disclosure. As shown in FIG. 6, a data packet processing method provided in an embodiment of the present disclosure may include:

601: A second delivery node receives a third uplink data packet sent by a second service node.

The second service node is the last service node in an uplink direction of a service chain determined by a first delivery node, the second delivery node is an uplink egress delivery node of the service chain, the third uplink data packet is obtained after the second service node receives a first uplink data packet sent by a first service node, performs service processing on the first uplink data packet to obtain a second uplink data packet, and deletes service node information of the service chain from the second uplink data packet.

In this embodiment of the present disclosure, as can be known from the description of the second service node in the foregoing embodiment, the second service node is the last service node in an uplink direction of the service chain. After the third uplink data packet flows out from the second service node, the third uplink data packet enters an uplink egress delivery node delivering the third uplink service packet. As can be known from the process of processing, by the first delivery node, the first service node, and the second service node, the uplink data packet in the foregoing embodiment, the uplink data packet passes through the first delivery node only once, without being returned to a delivery node repeatedly for multiple times before being sent from the delivery node, so that the data packet processing efficiency in a data packet processing system can be improved greatly.

602: The second delivery node sends the third uplink data packet to a destination device.

The second delivery node is deployed before the destination device.

In this embodiment of the present disclosure, the second delivery node is a delivery node deployed before the destination device. When the second delivery node receives the third uplink data packet from the service chain, the second delivery node may deliver the third uplink data packet to the destination device, so as to process an uplink data packet in the data packet processing system.

In some embodiments of the present disclosure, the second service node may further encapsulate service node information of the second service node into the third uplink data packet. After the receiving, by a second delivery node, a third uplink data packet sent by a second service node in step 601, the data packet processing method provided in this embodiment of the present disclosure may further include the following steps:

D1: The second delivery node parses out service node information of the second service node from the third uplink data packet.

D2: The second delivery node saves the service node information of the second service node into a bidirectional flow table.

That is, the bidirectional flow table is established in the second delivery node. After the second delivery node parses out service node information (that is, information about the second service node) of the last service node in the service chain from the third uplink data packet, the second delivery node saves the information about the second service node into the bidirectional flow table established by the second delivery node, so that after receiving a first downlink data packet sent by the destination device, the second delivery node may send the first downlink data packet to the first service node (that is, the second service node) performing service processing on the downlink data packet in the service chain, which can implement automatic association processing of the data flows in both directions and improve the processing performance of the data packet processing system. Specifically, the service node information of the second service node may refer to an IP address of the second service node. In this embodiment of the present disclosure, the service node information of the second service node may also refer to a specific identifier of the second service node, for example, the service node information of the second service node may be a device index of the second service node.

It should be noted that, in this embodiment of the present disclosure, the bidirectional flow table may include an uplink flow table and a downlink flow table, which are respectively used to record information about data packet flow directions in the uplink direction and a downlink direction of the service chain. The flow table may include quintuple information. For example, the flow table records a source IP address, a source port, a destination IP address, a destination port, and a transmission layer protocol number that are carried in a data packet. For the uplink direction of the service chain, after receiving the third uplink data packet from the second service node, the second delivery node saves a source IP address, a source port, and a destination IP address that are carried in the third uplink data packet into the downlink flow table, so that the second delivery node performs forwarding control by using the downlink flow table when processing a downlink data packet in the service chain.

It should be noted that, in this embodiment of the present disclosure, only for an uplink data packet that is sent for the first time in the service chain determined by the first delivery node, the second service node can encapsulate the service node information of the second service node into the third uplink data packet. However, for a subsequent third uplink data packet, because the second delivery node already records the service node information of the second service node in the bidirectional flow table, the second service node does not need to encapsulate the service node information of the second service node into the third uplink data packet again, and the second delivery node does not need to perform step D1 or step D2 again, that is, only when the second service node transmits the third uplink data packet for the first time by using the service chain, the second delivery node needs to perform D1 and D2.

It should be noted that, in some embodiments of the present disclosure, when the service node information of the second service node is a device index of the second service node, after the parsing out, by the second delivery node, service node information of the second service node from the third uplink data packet in step D1, the data packet processing method provided in this embodiment of the present disclosure may further include the following step:

querying, by the second delivery node according to a mapping relationship table set by a controller, an IP address corresponding to the device index of the second service node.

In this implementation scenario, the saving, by the second delivery node, the service node information of the second service node into a bidirectional flow table in step D2 is specifically:

saving, by the second delivery node, the IP address corresponding to the device index of the second service node into the bidirectional flow table.

That is, when the service node information encapsulated by the second service node in the third uplink data packet is not the IP address of the second service node but is a device index value of the second service node, after the second delivery node parses the third uplink data packet, the second delivery node needs to query, according to device index information, the mapping relationship table configured by the controller, to acquire the IP address corresponding to the second service node, so that the second delivery node can save, into the bidirectional flow table, the IP address of the second service node obtained by means of querying.

In some embodiments of the present disclosure, when there are multiple egress delivery nodes in a service chain, there may be a scenario in which an ingress delivery node of a downlink data packet is different from an egress delivery node of an uplink data packet. With reference to the foregoing implementation scenario, after the second delivery node parses out the information about the second service node from the uplink data packet, the data packet processing method provided in this embodiment of the present disclosure may further include the following step:

sending, by the second delivery node, the service node information of the second service node to a third delivery node, where the third delivery node is another uplink egress delivery node except the second delivery node in the service chain.

That is, there are two egress delivery nodes in the service chain, which are respectively the second delivery node and the third delivery node. If the third uplink data packet flows out from the service chain through the second delivery node, the first downlink data packet corresponding to the third uplink data packet may enter the service chain through the third delivery node. In order that the third delivery node can send the first downlink data packet to the service chain, the second delivery node may send service node information (that is, the service node information of the second service node) of the last service node in the service chain to the third delivery node, so as to maintain synchronization of the service node information between delivery nodes.

Figure 7:
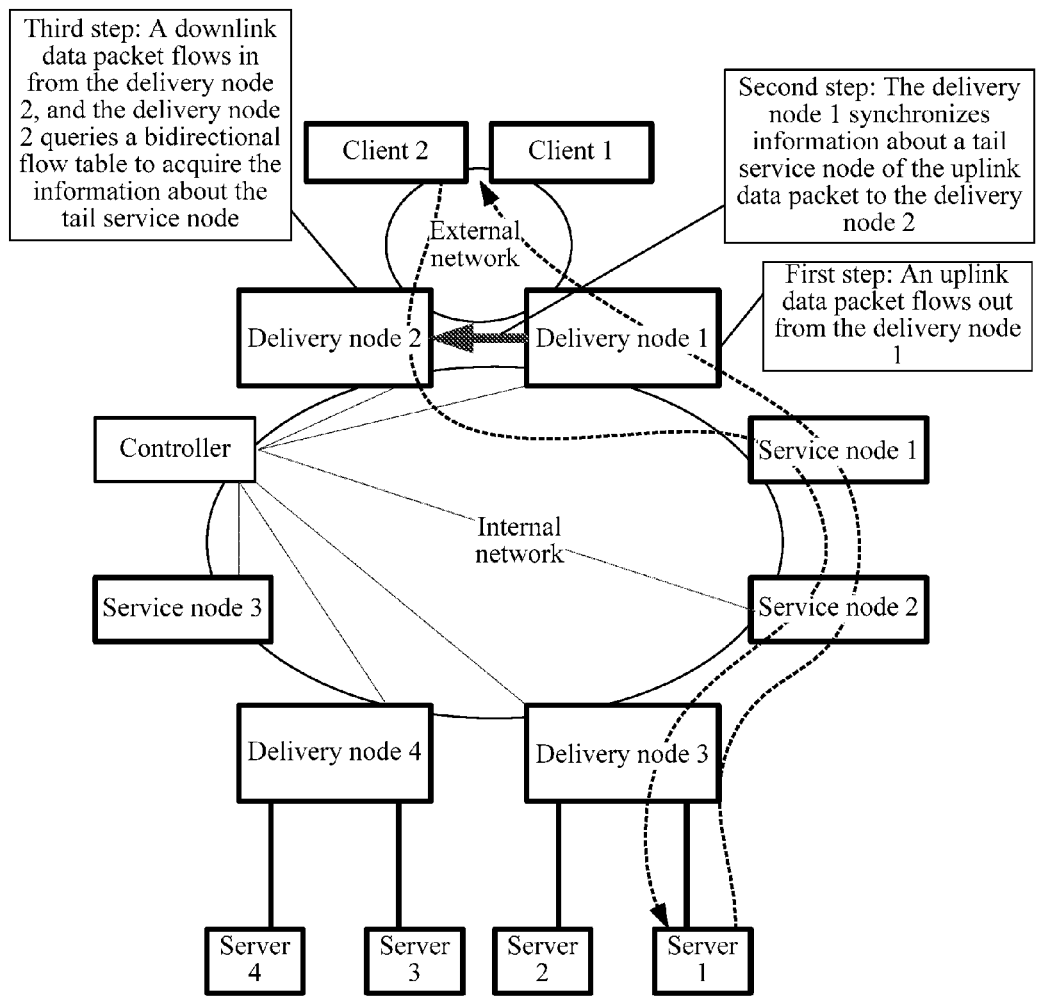
FIG. 7 is a schematic diagram of an implementation manner of multiple egress delivery nodes according to an embodiment of the present disclosure.

Exemplary description is provided as follows. Referring to FIG. 7, which shows a schematic diagram of an implementation manner of multiple egress delivery nodes provided according to an embodiment of the present disclosure. An uplink data packet from a server 1 to a client 2 flows out through a delivery node 1, but a downlink data packet from the client 2 to the server 1 flows in from a delivery node 2. When the egress delivery node 1 processes the uplink data packet, the egress delivery node 1 needs to synchronize service node information (which may also be referred to as information about a tail service node) of a corresponding service node 1 to the delivery node 2. This scenario is generally applied to networking of a route including multiple egresses. As shown in FIG. 7, in a first step, the uplink data packet flows out from the delivery node 1; in a second step, the delivery node 1 synchronizes the information about the tail service node of the uplink data packet to the delivery node 2; in a third step, the downlink data packet flows in from the delivery node 2, and the delivery node 2 queries a bidirectional flow table to acquire the information about the tail service node. The downlink data packet from the client 2 for accessing the server 1 may enter an internal network through the delivery node 1, or may enter an internal network through the delivery node 2. Certainly, in this embodiment of the present disclosure, it may be considered that the delivery node 1 and the delivery node 2 are different delivery units within a same logical delivery node, that is, the delivery node 1 and the delivery node 2 are in a same logical delivery node, to implement synchronization of the service node information between delivery units. This is applicable to an application scenario in which the service chain has multiple egress delivery nodes.

The foregoing embodiment describes an implementation process in which the second delivery node performs service processing on the uplink data packet, and the following describes a process of performing service processing on a downlink data packet. In this embodiment of the present disclosure, a data packet processing process may be: processing of data flows in both directions. Using a Web service based on the HTTP as an example, for each access process, there is a problem of data flows in both directions: an uplink data flow from a Client to a Server, and a downlink data flow from the Server to the Client. For some applications, for example, an active mode of the FTP, there may be a case in which the Server first initiates an uplink data flow to the Client and the Client returns a downlink data flow to the Server. Due to requirements of service processing on a service node, symmetric processing generally needs to be performed on data flows in both directions in a service chain.

In this embodiment of the present disclosure, for a method used by the second delivery node to perform service processing on a downlink data packet, refer to the description in the following embodiment. In some embodiments of the present disclosure, after the sending, by the second delivery node, the third uplink data packet to a destination device in step 602, the data packet processing method provided in this embodiment of the present disclosure may further include the following steps:

E1: The second delivery node receives a first downlink data packet that is returned by the destination device according to the third uplink data packet, where the second delivery node is a downlink ingress delivery node delivering the downlink data packet.

E2: The second delivery node sends the first downlink data packet to the second service node, where the second service node is the first service node in a downlink direction of the service chain.

The first downlink data packet is a data packet that is returned by the destination device according to the third uplink data packet. A forwarding process of the first downlink data packet is just opposite to that of the first uplink data packet. Symmetric processing is performed on the first downlink data packet in the service chain according to a service processing process opposite to that of the first uplink data packet. After the destination device receives the third uplink data packet, the destination device generates the first downlink data packet according to the third uplink data packet, and sends the first downlink data packet to a delivery node (that is, the second delivery node) that is before the destination device. The second service node is used as the first service node performing service processing on the downlink data packet in the service chain. The second delivery node sends the first downlink data packet to the second service node. For a process in which the second service node processes the first downlink data packet, refer to the description of the second service node in the foregoing embodiment, and details are not described herein again.

Further, the sending, by the second delivery node, the first downlink data packet to the second service node in step E2 is specifically:

sending, by the second delivery node, the first downlink data packet to the second service node according to the bidirectional flow table.

As can be known from the foregoing description, the bidirectional flow table is established in the second delivery node. After receiving the third uplink data packet, the second delivery node extracts a source IP address, a source port, a destination IP address, and a destination port from the third uplink data packet and saves the source IP address, the source port, the destination IP address, and the destination port into a downlink flow table, that is, the source IP address recorded in the downlink flow table is an IP address of the second service node. Therefore, when the second delivery node queries the downlink flow table, for an uplink direction, the source IP address is an IP address of the second service node, and for a downlink direction, the destination IP address is an IP address of the second service node. The second delivery node may send the first downlink data packet to the second service node according to information recorded in the downlink flow table. The second service node, as the first service node in the downlink direction of the service chain, may receive the first downlink data packet from the second delivery node.

In this embodiment of the present disclosure, the second delivery node is used as an uplink egress delivery node. The third uplink data packet needs to pass through the second delivery node only once before reaching the destination device, without being returned to the second delivery node repeatedly for multiple times before being sent from the second delivery node. Similarly, the first downlink data packet sent by the destination device passes through the second delivery node only once before reaching the second service node, without being returned to the second delivery node repeatedly for multiple times before being sent from the second delivery node; therefore, the data packet processing efficiency in this embodiment of the present disclosure is improved greatly compared with that in the prior art.

As can be known from the description of the present disclosure in the foregoing embodiment, the first service node sends the third uplink data packet obtained after the service node information is deleted to the second delivery node. The second delivery node, as an uplink egress delivery node of the service chain, receives the third uplink data packet, and sends the third uplink data packet to the destination device. Because in a data packet processing system, when service processing is performed on an uplink data packet, a first delivery node and a second delivery node are respectively used as an uplink ingress delivery node and an uplink egress delivery node of the uplink data packet, that is, delivery nodes are designed in a distributed manner in a data packet center system, and two delivery nodes are used to perform ingress delivery and egress delivery on the uplink data packet, the uplink data packet needs to pass through each of the first delivery node and the second delivery node only once, which can improve the data packet processing efficiency.

For better understanding and implementation of the foregoing solutions of the embodiments of the present disclosure, specific descriptions are provided below by using examples of corresponding application scenarios.

The data packet processing method provided in the embodiments of the present disclosure is applied to a scenario of distributed delivery nodes in a Service Chaining technology. A delivery policy only needs to be configured on an ingress delivery node, so that automatic association processing of data flows in both directions is implemented, configuration is simplified, and the data packet processing performance of a data packet processing system is improved.

Figure 8:
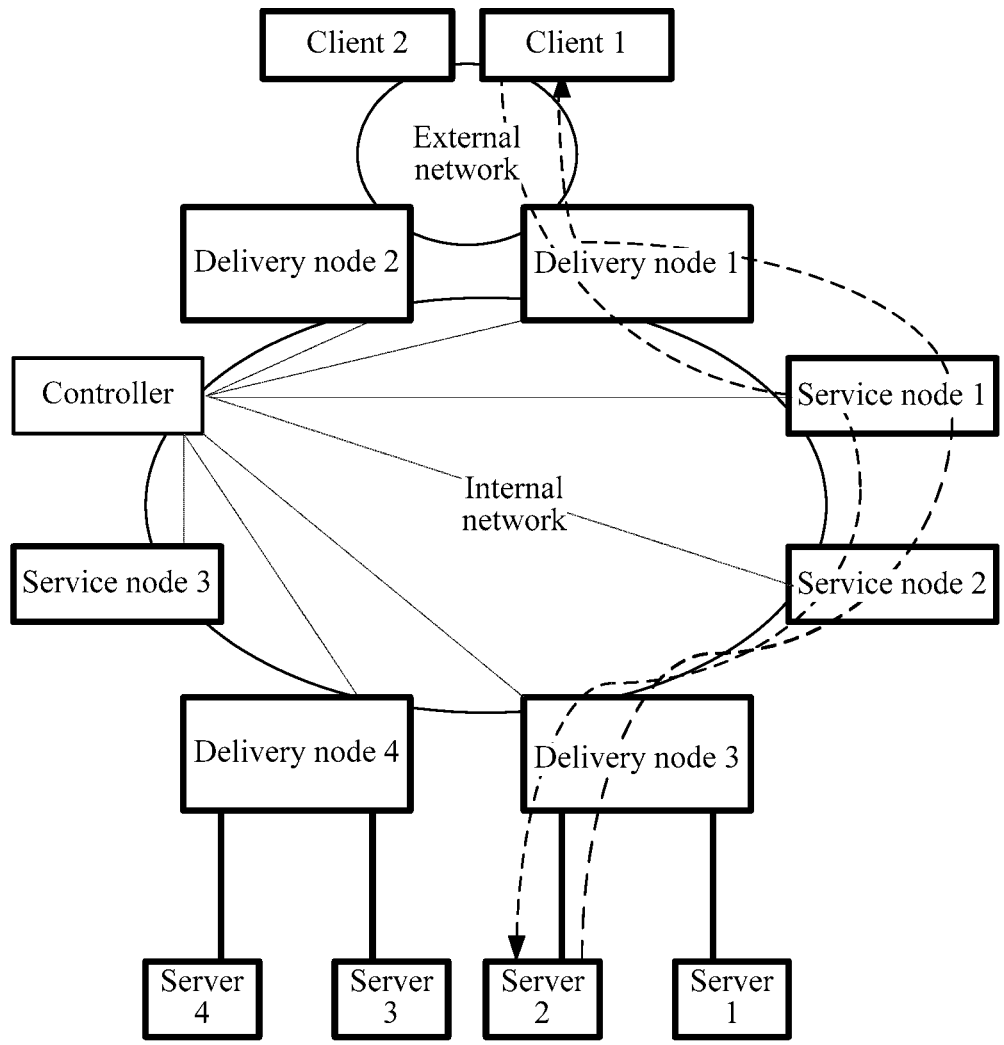
FIG. 8 is a schematic diagram showing that data flows in both directions are processed by distributed delivery nodes according to an embodiment of the present disclosure.

Referring to FIG. 8, which is a schematic diagram showing that data flows in both directions are processed by distributed delivery nodes according to an embodiment of the present disclosure. Pairs of delivery nodes process data flows in both directions in a service chain. A controller configures a delivery node and a service node, and the delivery node and the service node implement data flow forwarding control. The following provides an exemplary description of a data packet processing principle in this embodiment of the present disclosure. A controller, a delivery node 1, a delivery node 2, a delivery node 3, a delivery node 4, a service node 1, a service node 2, and a service node 3 are in an interconnected basic network. An uplink data packet from a client 1 to a server 2 is delivered to the service chain through the delivery node 1 to be processed, and after the processing is completed in the service chain, the uplink data packet is forwarded to the delivery node 3, and the delivery node 3 forwards the uplink data packet to the server 2. A corresponding downlink data packet is delivered to the service chain through the delivery node 3 to be processed, and after the processing is completed in the service chain, the downlink data packet is forwarded to the delivery node 1, and the delivery node 1 forwards the downlink data packet to the client 1.

The following separately describes an uplink data packet processing method and a downlink data packet processing method by using examples. Referring to FIG. 9-*a* and FIG. 9-*b*, which are a schematic diagram of an uplink data packet processing process and a schematic diagram of a downlink data packet processing process respectively.

As shown in FIG. 9-*a*, the uplink data packet processing process is described first.

First step: An uplink data packet reaches an ingress delivery node.

Second step: A delivery node 1 determines all service nodes of a service chain according to a configured delivery policy, and sends the uplink data packet to the corresponding service chain to perform processing.

In this embodiment of the present disclosure, in order that a tunneling technology can be used, the method provided in this embodiment of the present disclosure may further include the following step:

encapsulating, by the delivery node 1, a tunneling header into the uplink data packet.

That is, in this embodiment of the present disclosure, an uplink data packet is sent between the delivery node 1 and a service node 1 by using the tunneling technology. Before the tunneling technology is used, the delivery node 1 first encapsulates the tunneling header into the uplink data packet. The tunneling header carries information about a tunneling protocol. The encapsulated uplink data packet is forwarded between two ends (that is, the delivery node 1 and the service node 1) of a tunnel through a basic routing network. Specifically, a Generic Routing Encapsulation (GRE) tunnel may be used for implementation. Another tunneling technology may also be used for implementation, for example, Network Virtual using Generic Routing Encapsulation (NVGRE) or a Virtual eXtensible Local Area Network (VXLAN).

For an uplink data packet entering a service chain to be processed, a delivery node needs to specify service nodes included in the service chain. Direct node-to-node sending of a packet may be implemented between a delivery node and a service node and between the service node and the service node by using a tunneling technology (for example, the GRE tunnel). An ingress delivery node modifies a packet header of the uplink data packet, adds a specific field, and adds, in the uplink data packet, routing information of a service node that the packet needs to pass through. Then, each service node may acquire service node information of a next-hop service node by parsing the specific field of the uplink data packet.

Third step: The last service node of the service chain adds service node information of the service node to a header of the uplink data packet, and sends the uplink data packet.

Generally, for an uplink data packet of an ingress delivery node, it is quite hard for the ingress delivery node of the service chain to specify an egress delivery node of the service chain. For example, in FIG. 9-*a*, first, the delivery node 1 needs to store a list of servers that are correspondingly associated with a delivery node 3 and a delivery node 4; second, in a data packet processing system, an operation of switching between virtual machines may need to be performed, for example, a service on a server 2 deployed under the delivery node 3 needs to be handed over to a server 3 deployed after the delivery node 4 to be processed, and the delivery node 1 also needs to refresh an association list between other delivery nodes and corresponding servers. In this embodiment of the present disclosure, only service nodes in the service chain may be configured on the ingress delivery node, but an egress delivery node is not configured. The ingress delivery node modifies an uplink data packet, encapsulates service node information, and sends the packet to a next-hop service node through a tunnel. The service node parses the uplink data packet to acquire information about the next-hop service node, and sends the uplink data packet to the next-hop service node through the tunnel.

The last service node (that is, a service node 2) in the service chain adds service node information of the service node, for example, an IP address or a device index of the service node, to a packet header of the uplink data packet, and directly sends the uplink data packet. When forwarding the first packet of the uplink data packet, the last service node does not know delivery node information of an egress delivery node. The uplink data packet is forwarded by means of normal routing, and reaches the egress delivery node.

Fourth step: The uplink data packet reaches the egress delivery node of the service chain, and the egress delivery node establishes a bidirectional flow table, where the bidirectional flow table records the service node information of the last service node.

The egress delivery node receives the uplink data packet sent by the last service node in the service chain, and establishes the bidirectional flow table. The egress delivery node acquires the service node information of the last service node in the service chain by parsing the uplink data packet, and saves the service node information of the last service node into the bidirectional flow table. If a device index is acquired after the uplink data packet is parsed, an IP address corresponding to a device index value may be acquired by using a mapping relationship table configured by a controller.

As can be known from the description of the present disclosure in the foregoing embodiment, a client 1 sends an uplink data packet to a delivery node 1. The delivery node 1 determines, according to a delivery policy configured by a controller, a service chain corresponding to the uplink data packet, encapsulates service node information of the service chain into the uplink data packet, and sends, to a service node 1 in the service chain, the uplink data packet in which the service node information is encapsulated. The service node 1 performs service processing on the received uplink data packet, and sends an uplink data packet obtained after the service processing to a service node 2 according to the service node information. After receiving the uplink data packet sent by the service node 1, the service node 2 determines, according to the service node information, that the service node 2 is the last service node performing service processing on the uplink data packet in the service chain.

The service node 2 performs service processing on the uplink data packet, deletes the service node information from the uplink data packet obtained after the service processing, and sends the uplink data packet obtained after the service node information is deleted to a delivery node 3. The delivery node 3, as an uplink egress delivery node delivering the uplink data packet, receives the uplink data packet and sends the data packet to a server 2. Because in a data packet processing system, when service processing is performed on an uplink data packet, a delivery node 1 and a delivery node 3 are respectively used as an uplink ingress delivery node and an uplink egress delivery node of the uplink data packet, that is, delivery nodes are designed in a distributed manner in a data packet center system, and two delivery nodes are used to perform ingress delivery and egress delivery on the uplink data packet, the uplink data packet needs to pass through each of the delivery node 1 and the delivery node 3 only once, which can improve the data packet processing efficiency.

As shown in FIG. 9-b, a downlink data packet processing process is described in the following.

First step: A downlink data packet reaches an associated ingress delivery node.

Second step: The ingress delivery node queries a bidirectional flow table, acquires service node information of the last service node (that is, the first service node of the downlink data packet) of an uplink data packet from service node information recorded in the bidirectional flow table, and sends the downlink data packet.

The downlink data packet reaches an egress delivery node of the uplink data packet, that is, the ingress delivery node of the downlink data packet, and hits the bidirectional flow table, service node information of a service node 2 in the bidirectional flow table is used as a forwarding destination address, and the packet is sent through a tunnel, thereby implementing automatic association processing of data flows in both directions.

Third step: A service chain processes the downlink data packet, and a service node sends the downlink data packet to another service node through a tunnel.

Fourth step: An egress delivery node of the downlink data packet parses the downlink data packet, and sends the downlink data packet.

As can be known from the description of the present disclosure in the foregoing embodiment, a client 1 sends an uplink data packet to a delivery node 1. The delivery node 1 determines, according to a delivery policy configured by a controller, a service chain corresponding to the uplink data packet, encapsulates service node information of the service chain into the uplink data packet, and sends, to a service node 1 in the service chain, the uplink data packet in which the service node information is encapsulated. The service node 1 performs service processing on the received uplink data packet, and sends an uplink data packet obtained after the service processing to a service node 2 according to the service node information. After receiving the uplink data packet sent by the service node 1, the service node 2 determines, according to the service node information, that the service node 2 is the last service node performing service processing on the uplink data packet in the service chain. The service node 2 performs service processing on the uplink data packet, deletes the service node information from the uplink data packet obtained after the service processing, and sends the uplink data packet obtained after the service node information is deleted to a delivery node 3. The delivery node 3, as an uplink egress delivery node delivering the uplink data packet, receives the uplink data packet and sends the data packet to a server 2. Because in a data packet processing system, when service processing is performed on an uplink data packet, a delivery node 1 and a delivery node 3 are respectively used as an uplink ingress delivery node and an uplink egress delivery node of the uplink data packet, that is, delivery nodes are designed in a distributed manner in a data packet center system, and two delivery nodes are used to perform ingress delivery and egress delivery on the uplink data packet, the uplink data packet needs to pass through each of the delivery node 1 and the delivery node 3 only once, which can improve the data packet processing efficiency.

Figure 10:
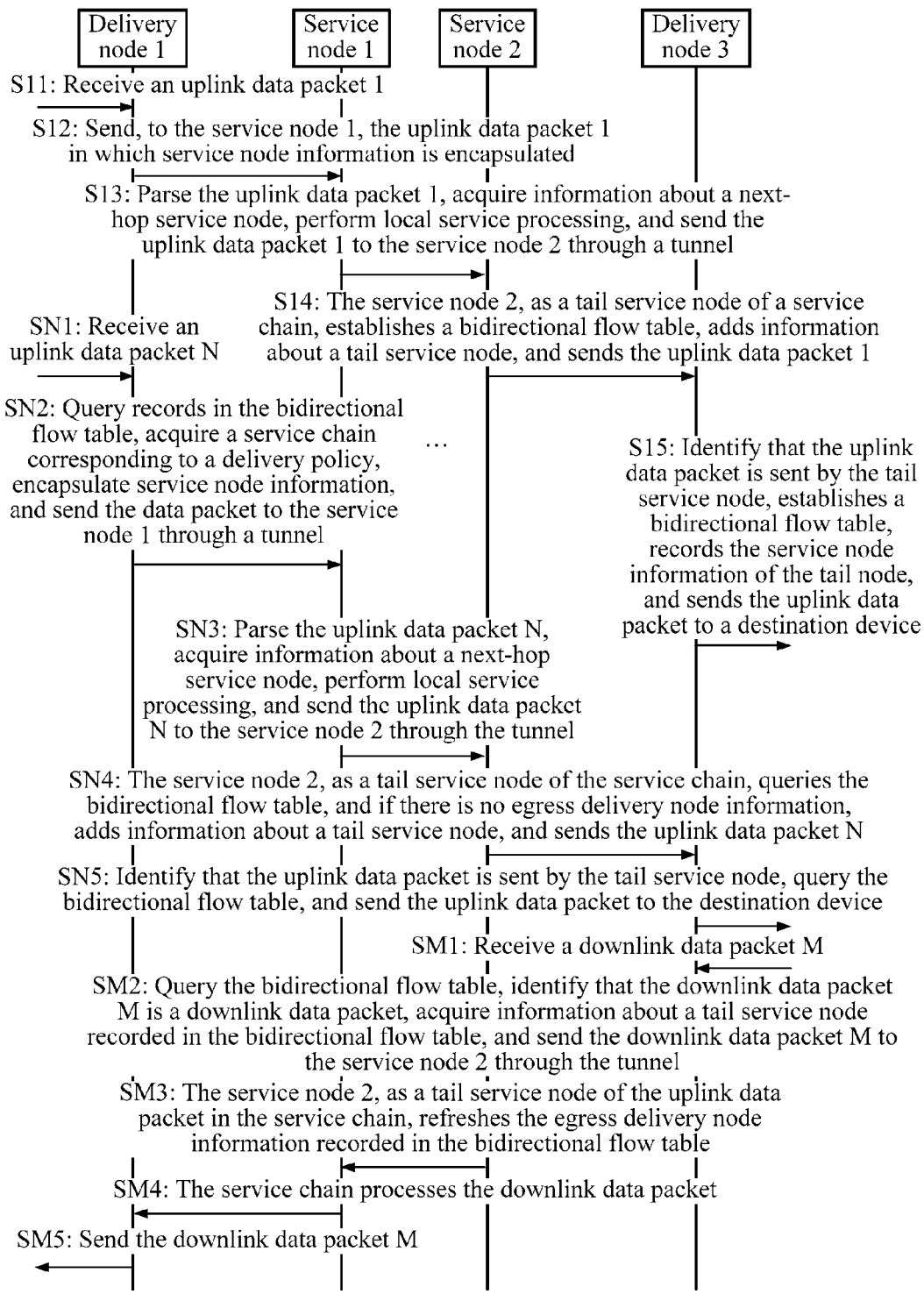
FIG. 10 is a schematic diagram of an interaction process between delivery nodes and service nodes that process data packets in both directions according to an embodiment of the present disclosure.

The following describes, by using another application scenario, the data packet processing method provided in the embodiments of the present disclosure. Referring to FIG. 10, which is a schematic diagram of an interaction process between a delivery node and a service node that process data packets in both directions according to an embodiment of the present disclosure.

A data packet processing system includes a controller, a delivery node 1, a delivery node 2, a delivery node 3, a delivery node 4, a service node 1, a service node 2, and a service node 3. The delivery node 3 is deployed before a server 1 and a server 2 and the delivery node 4 is deployed before a server 3 and a server 4. All delivery nodes and all service nodes are configured by the controller. The controller, all the delivery nodes, and all the service nodes are in an interconnected basic network. Using implementation of a service chain 1 as an example for description, in a process in which a client 1 initiates access to the server 2, the client 1 is used as a source device, a service chain obtained through matching according to a data packet is the service chain 1, the delivery node 1 is used as an uplink ingress delivery node, the service node 1 and the service node 2 need to perform service processing on an uplink data packet sequentially, the delivery node 3 is used as an uplink egress delivery node, the server 2 is a destination device, and service node information of the service node 1 and the service node 2 correspond to the service chain 1. For a downlink data packet sent by the server 2, the delivery node 3 is used as a downlink ingress delivery node, the service node 2 and the service node 1 need to perform service processing on the downlink data packet sequentially, and the delivery node 2 is used as a downlink egress delivery node.

The following describes in detail an interaction process between a delivery node and a service node that process data packets in both directions.

This embodiment of the present disclosure includes an uplink flow processing part and a downlink flow processing part. Detailed descriptions are provided as follows:

An uplink data packet 1 sent by the client 1 is described first, and the following steps are mainly included:

S11: The delivery node 1 receives the uplink data packet 1.

The uplink data packet 1, as the first packet, reaches an ingress gateway, and the ingress gateway may be used as an ingress delivery node. The uplink data packet from the client 1 for accessing the server 2 reaches the delivery node 1.

S12: The delivery node 1 queries a delivery policy, acquires a service chain corresponding to the uplink data packet 1, encapsulates service node information of the service chain into the uplink data packet 1, and sends, to the service node 1 through a tunnel, the uplink data packet 1 in which the service node information is encapsulated.

The delivery node 1 implements the following function according to configuration of the controller: sending the uplink data packet 1 matching the delivery policy to a service chain associated with the delivery policy. If the delivery policy is that the uplink data packet from the client 1 to the server 2 needs to pass through the service node 1 and the service node 2 sequentially to perform service processing. The delivery node 1 modifies the corresponding uplink data packet, encapsulates service node information of the service node 1 and service node information of the service node 2 into a packet header, and sends, to the service node 1, the uplink data packet in which the service node information of the service node 1 and the service node information of the service node 2 are encapsulated. Referring to Table 1 in FIG. 15, which shows an implementation manner in which the delivery node 1 encapsulates service node information into a packet header of an uplink data packet, where the service node information of the service node 1 and the service node information of the service node 2 are separately encapsulated into the packet header of the uplink data packet, and a data length and type of encapsulated service node information are defined.

S13: The service node 1 parses the uplink data packet 1, acquires information about a next-hop service node, performs local service processing, and sends the uplink data packet 1 to the service node 2 through the tunnel.

After parsing the uplink data packet, an intermediate service node of the service chain acquires an original packet, performs corresponding service processing, and sends the uplink data packet to the next-hop service node through the tunnel according to the service node information acquired by parsing the uplink data packet. A service node in the service chain may determine, according to data in a header of the service node information in the uplink data packet, whether the service node is the last service node in an uplink direction of the service chain for the uplink data packet, that is, a tail service node.

S14: The service node 2, as a tail service node of the service chain, establishes a bidirectional flow table, adds information about the tail service node, and sends the uplink data packet 1.

The last service node of the service chain is used as a termination node of the tunnel, first deletes outer layer tunnel information of the uplink data packet, and then needs to delete service node information added by the ingress delivery node. The last service node of the service chain needs to establish a bidirectional flow table and record routing information of the service chain. For the first packet of the uplink data packet, the tail service node of the service chain does not specify IP information of an egress delivery node of the tail service node and cannot send the uplink data packet to the egress delivery node directly through the tunnel. The tail service node of the service chain modifies the uplink data packet, adds a local information header, and sends the packet normally without using the tunnel. An objective of adding the local information header is to notify the egress delivery node of the information about the tail service node of the uplink data packet. For subsequent packets of the uplink data packet, if address information of an egress delivery node cannot be obtained by querying the bidirectional flow table, a processing process is the same as that of the first packet. If address information of an egress delivery node can be obtained by querying the bidirectional flow table, a header of the information about the tail service node does not need to be added, and the subsequent packets are directly sent to the egress delivery node through the tunnel. The tail service node establishes the bidirectional flow table when processing the first packet of the uplink data packet. The bidirectional flow table records address information of an egress delivery node. Content of the bidirectional flow table is initialized to zero when the bidirectional flow table is established, and a valid value of the address information is acquired, in a process of processing a downlink data packet, from the downlink data packet flowing from the egress delivery node. Referring to Table 2 in FIG. 16, which shows an implementation manner in which the service node 2 encapsulates service node information into a packet header of an uplink data packet, where service node information of the last service node in the service chain is encapsulated into the packet header of the uplink data packet, and a data length and type of encapsulated service node information are defined.

S15: The delivery node 2 identifies that the uplink data packet is sent by the tail service node, establishes a bidirectional flow table, records the service node information of the tail node, and sends the uplink data packet to a destination device.

The egress delivery node may identify, according to header information of the uplink data packet, that the uplink data packet sent by the tail service node of the service chain is received. For this type of packet, the egress delivery node establishes the bidirectional delivery node, records the information about the tail service node in a downlink flow table, to implement automatic association of flows in both directions. The header of the information about the tail service node of the uplink data packet is deleted, and the uplink data packet is normally sent to the corresponding destination device.

The foregoing describes, by using an example, a process of processing the uplink data packet 1. Similarly, a process of processing an uplink data packet N (N is a natural number greater than 1) in this embodiment of the present disclosure may further mainly include the following steps:

SN1: The delivery node 1 receives the uplink data packet N.

SN2: The delivery node 1 queries records in the bidirectional flow table, acquires a service chain corresponding to the data packet, encapsulates service node information, and sends the data packet to the service node 1 through a tunnel.

SN3: The service node 1 parses the uplink data packet N, acquires information about a next-hop service node, performs local service processing, and sends the uplink data packet N to the service node 2 through the tunnel.

SN4: The service node 2, as a tail service node of the service chain, queries the bidirectional flow table, and if there is no egress delivery node information, adds information about a tail service node, and sends the uplink data packet N.

SN5: The delivery node 2 identifies that the uplink data packet is sent by the tail service node, queries the bidirectional flow table, and sends the uplink data packet to the destination device.

The following describes a downlink data packet M (M is a natural number that is not zero) sent by the server 2, and the following steps are mainly included:

SM1: The delivery node 2 receives the downlink data packet M.

SM2: The delivery node 2 queries the bidirectional flow table, identifies that the downlink data packet M is a downlink data packet, acquires information about a tail service node recorded in the bidirectional flow table, and sends the downlink data packet M to the service node 2 through the tunnel.

The downlink data packet is sent to the delivery node 2 by a destination device, and the delivery node 2 queries the bidirectional flow table according to the downlink data packet. It may be identified according to flow table information that the downlink data packet corresponds to the uplink data packet M. The delivery node 2 sends the downlink data packet M to the tail service node (that is, the service node 2) through the tunnel according to the information about the tail service node recorded in the bidirectional flow table.

SM3: The service node 2, as a tail service node of the uplink data packet in the service chain, refreshes the egress delivery node information recorded in the bidirectional flow table.

The downlink data packet M reaches the first service node (that is, the tail service node of the uplink data packet), the service node 2 queries the bidirectional flow table, and identifies that the downlink data packet M is a downlink data packet. First, information in a local bidirectional flow table is refreshed. In an uplink flow table, information about an ingress delivery node (that is, the egress delivery node of the uplink data packet) of the downlink data packet is recorded. A subsequent uplink data packet hits the uplink flow table, and the egress delivery node information may be acquired directly. Second, service node information is added to the downlink data packet, and the downlink data packet is sent to the next-hop service node through the tunnel to be processed in the service chain.

SM4: The service chain processes the downlink data packet.

The intermediate service node in the service chain queries the bidirectional flow table, and may identify the data packet is a downlink data packet. After the service processing, the service node information is acquired by parsing the data packet, and the downlink data packet is sent to the next-hop service node through the tunnel.

SM5: The delivery node 1 sends the downlink data packet M.

The tail service node of the downlink data packet may acquire a next-hop egress tunnel by querying the local bidirectional flow table, and send the downlink data packet to the egress delivery node. The egress delivery node parses the tunnel, deletes a tunnel header, deletes the header of the service node information, and forwards the downlink data packet to a source device.

As can be known from the exemplary description of the present disclosure in the foregoing embodiment, a tail service node of a service chain adds an identifier to a header of a data packet, adds information about the tail service node, and normally sends the data packet to an egress delivery node. The egress delivery node establishes a bidirectional flow table, identifies the information about the tail service node in the data packet, and records the information about the tail service node in the bidirectional flow table, thereby implementing automatic association of data flows in both directions. A data packet processing system can implement automatic association processing of data flows in both directions, reduce the configuration complexity, and improve the system processing performance.

It should be noted that, for brief description, the foregoing method embodiments are represented as a combination of a series of actions. However, persons skilled in the art should appreciate that the present disclosure is not limited to the described order of the actions, because according to the present disclosure, some steps may be performed in other order or simultaneously. In addition, persons skilled in the art should also understand that all the embodiments described in this specification belong to exemplary embodiments, and the involved actions and modules are not necessarily mandatory to the present disclosure.

To better implement the foregoing solutions of the embodiments of the present disclosure, related apparatuses configured to implement the foregoing solutions are further provided below.

As shown in FIG. 11-*a*, an embodiment of the present disclosure provides a service node 1100. The service node is a second service node. The second service node includes a receiving module 1101, a service processing module 1102, a decapsulation module 1103, and a sending module 1104, where the receiving module 1101 is configured to receive a first uplink data packet sent by a first service node, where the first uplink data packet carries service node information corresponding to a service chain determined by a first delivery node, the first service node is a previous-hop service node, adjacent to the second service node, in the service chain, and the first delivery node is an uplink ingress delivery node of the service chain;

the service processing module 1102 is configured to perform service processing on the first uplink data packet, to obtain a second uplink data packet;

the decapsulation module 1103 is configured to: when the second service node determines, according to the service node information, that the second service node is the last service node in an uplink direction of the service chain, delete the service node information from the second uplink data packet, to obtain a third uplink data packet; and the sending module 1104 is configured to send the third uplink data packet to a second delivery node, where the second delivery node is an uplink egress delivery node of the service chain.

As shown in FIG. 11-*b*, in some embodiments of the present disclosure, relative to the service node shown in FIG. 11-*a*, the second service node 1100 further includes a query module 1105, where the query module 1105 is configured to: before the sending module 1104 sends the third uplink data packet to the second delivery node, query an uplink egress delivery node of the third uplink data packet according to a bidirectional flow table; and if the query module 1105 does not obtain the uplink egress delivery node by means of querying, the sending module 1104 is configured to send the third uplink data packet to the second delivery node according to a forwarding route; or if the query module 1105 obtains by means of querying that the uplink egress delivery node is the second delivery node, the sending module 1104 is configured to send the third uplink data packet to the second delivery node according to the bidirectional flow table.

As shown in FIG. 11-*c*, in some embodiments of the present disclosure, relative to the service node shown in FIG. 11-*a*, the second service node 1100 further includes a first encapsulation module 1106, where the first encapsulation module 1106 is configured to: before the sending module 1104 sends the third uplink data packet to the second delivery node, encapsulate service node information of the second service node into the third uplink data packet; and the sending module 1104 is configured to send, to the second delivery node, the third uplink data packet in which the service node information of the second service node is encapsulated.

As shown in FIG. 11-*d*, in some embodiments of the present disclosure, relative to the service node shown in FIG. 11-*a*, the second service node 1100 further includes a second encapsulation module 1107, where the receiving module 1101 is further configured to: after the sending module 1104 sends the third uplink data packet to the second delivery node, receive a first downlink data packet sent by the second delivery node;

the service processing module 1102 is further configured to perform service processing on the first downlink data packet, to obtain a second downlink data packet;

the second encapsulation module 1107 is configured to encapsulate the service node information of the service chain into the second downlink data packet, to obtain a third downlink data packet; and the sending module 1104 is further configured to send the third downlink data packet to the first service node.

As shown in FIG. 11-*e*, in some embodiments of the present disclosure, relative to the service node shown in FIG. 11-*d*, the second service node 1100 further includes a saving module 1108, configured to: after the sending module 1104 determines, according to the bidirectional flow table, that the second downlink data packet is a downlink data packet in the service chain, save delivery node information of the second delivery node into the bidirectional flow table.

As can be known from the description of the present disclosure in the foregoing embodiment, a first service node sends a first uplink data packet to a next-hop service node according to service node information corresponding to a service chain and enables the first uplink data packet to reach the last service node (that is, a second service node) in an uplink direction of the service chain. The last service node performs service processing on the first uplink data packet to obtain a second uplink data packet, deletes the service node information from the second uplink data packet, and sends a third uplink data packet obtained after the service node information is deleted to a second delivery node. The second delivery node, as an uplink egress delivery node of the service chain, receives the third uplink data packet and sends the third uplink data packet to a destination device. Because in a data packet processing system, when service processing is performed on an uplink data packet, a first delivery node and a second delivery node are respectively used as an uplink ingress delivery node and an uplink egress delivery node of the uplink data packet, that is, delivery nodes are designed in a distributed manner in a data packet center system, and two delivery nodes are used to perform ingress delivery and egress delivery on the uplink data packet, the uplink data packet needs to pass through each of the first delivery node and the second delivery node only once, which can improve the data packet processing efficiency.

As shown in FIG. 12-*a*, an embodiment of the present disclosure provides a delivery node 1200. The delivery node is a second delivery node. The second delivery node includes a receiving module 1201 and a sending module 1202, where the receiving module 1201 is configured to receive a third uplink data packet sent by a second service node, where the second service node is the last service node in an uplink direction of a service chain determined by a first delivery node, the second delivery node is an uplink egress delivery node of the service chain, the third uplink data packet is obtained after the second service node receives a first uplink data packet sent by a first service node, performs service processing on the first uplink data packet to obtain a second uplink data packet, and deletes service node information of the service chain from the second uplink data packet; and the sending module 1202 is configured to send the third uplink data packet to a destination device, where the second delivery node is deployed before the destination device.

As shown in FIG. 12-*b*, in some embodiments of the present disclosure, relative to the delivery node shown in FIG. 12-*a*, the second delivery node 1200 further includes a parsing module 1203 and a saving module 1204, where the parsing module 1203 is configured to: parse out service node information of the second service node from the third uplink data packet, after the receiving module 1201 receives the third uplink data packet sent by the second service node; and the saving module 1204 is configured to save the service node information of the second service node into a bidirectional flow table.

As shown in FIG. 12-*c*, in some embodiments of the present disclosure, relative to the delivery node in FIG. 12-*b*, when the service node information of the second service node is a device index of the second service node, the second delivery node 1200 further includes a query module 1205, where the query module 1205 is configured to: query, according to a mapping relationship table set by a controller, an Internet Protocol IP address corresponding to the device index of the second service node, after the parsing module 1203 parses out the service node information of the second service node from the third uplink data packet; and the saving module 1204 is configured to save the IP address corresponding to the device index of the second service node into the bidirectional flow table.

In some embodiments of the present disclosure, the sending module 1202 is further configured to: send the service node information of the second service node to a third delivery node, after the parsing module 1203 parses out the service node information of the second service node from the third uplink data packet, where the third delivery node is another uplink egress delivery node except the second delivery node in the service chain.

In some embodiments of the present disclosure, the receiving module 1201 is further configured to: after the sending module 1202 sends the third uplink data packet to the destination device, receive a first downlink data packet that is returned by the destination device according to the third uplink data packet; and the sending module 1202 is further configured to send the first downlink data packet to the second service node.

Further, the sending module 1202 is configured to send the first downlink data packet to the second service node according to the bidirectional flow table.

As can be known from the description of the present disclosure in the foregoing embodiment, a first service node sends a first uplink data packet to a next-hop service node according to service node information corresponding to a service chain and enables the first uplink data packet to reach the last service node (that is, a second service node) in an uplink direction of the service chain. The last service node performs service processing on the first uplink data packet to obtain a second uplink data packet, deletes the service node information from the second uplink data packet, and sends a third uplink data packet obtained after the service node information is deleted to a second delivery node. The second delivery node, as an uplink egress delivery node of the service chain, receives the third uplink data packet and sends the third uplink data packet to a destination device. Because in a data packet processing system, when service processing is performed on an uplink data packet, a first delivery node and a second delivery node are respectively used as an uplink ingress delivery node and an uplink egress delivery node of the uplink data packet, that is, delivery nodes are designed in a distributed manner in a data packet center system, and two delivery nodes are used to perform ingress delivery and egress delivery on the uplink data packet, the uplink data packet needs to pass through each of the first delivery node and the second delivery node only once, which can improve the data packet processing efficiency.

An embodiment of the present disclosure further provides a computer storage medium, where the computer storage medium stores a program, and when the program is executed, some or all of the steps recorded in the foregoing method embodiments are performed.

The following describes another service node according to an embodiment of the present disclosure. The service node is a second service node. As shown in FIG. 13, a second service node 1300 includes:

an input apparatus 1301, an output apparatus 1302, a processor 1303, and a memory 1304 (there may be one or more processors 1303 in the second service node 1300, and in FIG. 13, one processor is used as an example). In some embodiments of the present disclosure, the input apparatus 1301, the output apparatus 1302, the processor 1303, and the memory 1304 may be connected by using a bus or in another manner, and connection by using a bus is used as an example in FIG. 13.

The processor 1303 is configured to perform the following steps:

receiving a first uplink data packet sent by a first service node, where the first uplink data packet carries service node information corresponding to a service chain determined by a first delivery node, the first service node is a previous-hop service node, adjacent to the second service node, in the service chain, and the first delivery node is an uplink ingress delivery node of the service chain;

performing service processing on the first uplink data packet, to obtain a second uplink data packet;

when the second service node determines, according to the service node information, that the second service node is the last service node in an uplink direction of the service chain, deleting the service node information from the second uplink data packet, to obtain a third uplink data packet; and sending the third uplink data packet to a second delivery node, where the second delivery node is an uplink egress delivery node of the service chain.

In some embodiments of the present disclosure, the processor 1303 is configured to perform the following steps:

before the sending the third uplink data packet to a second delivery node, querying an uplink egress delivery node of the third uplink data packet according to a bidirectional flow table; and if the uplink egress delivery node is not obtained by means of querying, the processor 1303 is configured to perform the following step: sending the third uplink data packet to the second delivery node according to a forwarding route; or if it is obtained by means of querying that the uplink egress delivery node is the second delivery node, the processor 1303 is configured to perform the following step: sending the third uplink data packet to the second delivery node according to the bidirectional flow table.

In some embodiments of the present disclosure, the processor 1303 is further configured to perform the following step:

before the sending the third uplink data packet to a second delivery node, encapsulating service node information of the second service node into the third uplink data packet; and the processor 1303 is configured to perform the following step:

sending, to the second delivery node, the third uplink data packet in which the service node information of the second service node is encapsulated.

In some embodiments of the present disclosure, the processor 1303 is further configured to perform the following step:

After the sending the third uplink data packet to a second delivery node, receiving a first downlink data packet sent by the second delivery node;

performing service processing on the first downlink data packet, to obtain a second downlink data packet;

determining, according to the bidirectional flow table, that the second downlink data packet is a downlink data packet in the service chain;

encapsulating the service node information of the service chain into the second downlink data packet, to obtain a third downlink data packet; and sending the third downlink data packet to the first service node.

In this case, the processor 1303 is further configured to perform the following step:

after the determining, according to the bidirectional flow table, that the second downlink data packet is a downlink data packet in the service chain, saving delivery node information of the second delivery node into the bidirectional flow table.

As can be known from the description of the present disclosure in the foregoing embodiment, a first service node sends a first uplink data packet to a next-hop service node according to service node information corresponding to a service chain and enables the first uplink data packet to reach the last service node (that is, a second service node) in an uplink direction of the service chain. The last service node performs service processing on the first uplink data packet to obtain a second uplink data packet, deletes the service node information from the second uplink data packet, and sends a third uplink data packet obtained after the service node information is deleted to a second delivery node. The second delivery node, as an uplink egress delivery node of the service chain, receives the third uplink data packet and sends the third uplink data packet to a destination device. Because in a data packet processing system, when service processing is performed on an uplink data packet, a first delivery node and a second delivery node are respectively used as an uplink ingress delivery node and an uplink egress delivery node of the uplink data packet, that is, delivery nodes are designed in a distributed manner in a data packet center system, and two delivery nodes are used to perform ingress delivery and egress delivery on the uplink data packet, the uplink data packet needs to pass through each of the first delivery node and the second delivery node only once, which can improve the data packet processing efficiency.

Figures 14, 15, 16:
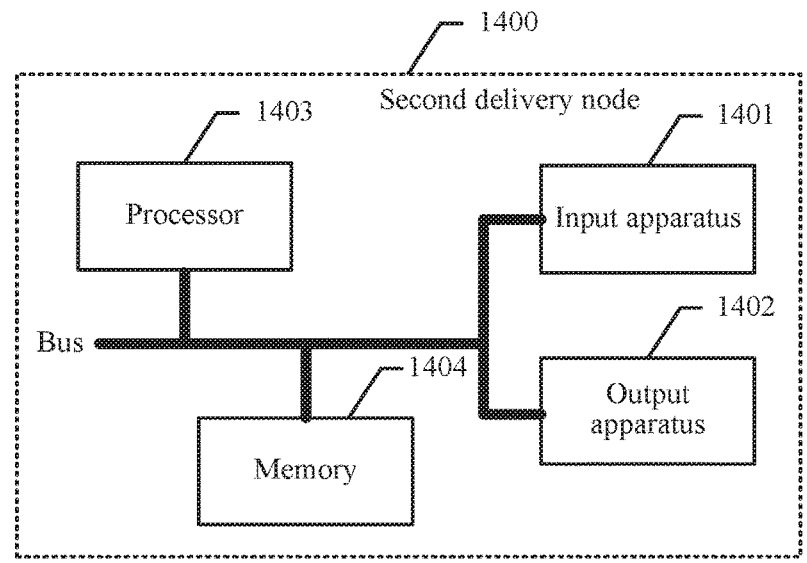
FIG. 14 is a schematic structural diagram of another delivery node according to an embodiment of the present disclosure.
FIG. 15 is a first table showing an implementation of a delivery node encapsulating a service node information into a packet header of an uplink data packet.
FIG. 16 is a second table showing an implementation of a service node encapsulates service node information into a packet header of an uplink data packet.

The following describes another delivery node according to an embodiment of the present disclosure. The delivery node is a second delivery node. As shown in FIG. 14, a second delivery node 1400 includes:

an input apparatus 1401, an output apparatus 1402, a processor 1403, and a memory 1404 (there may be one or more processors 1403 in the second delivery node 1400, and in FIG. 14, one processor is used as an example). In some embodiments of the present disclosure, the input apparatus 1401, the output apparatus 1402, the processor 1403, and the memory 1404 may be connected by using a bus or in another manner, and connection by using a bus is used as an example in FIG. 14.

The processor 1403 is configured to perform the following steps:

receiving a third uplink data packet sent by a second service node, where the second service node is the last service node in an uplink direction of a service chain determined by a first delivery node, the second delivery node is an uplink egress delivery node of the service chain, and the third uplink data packet is obtained after the second service node receives a first uplink data packet sent by a first service node, performs service processing on the first uplink data packet to obtain a second uplink data packet, and deletes service node information of the service chain from the second uplink data packet; and sending the third uplink data packet to a destination device, where the second delivery node is deployed before the destination device.

In some embodiments of the present disclosure, the processor 1403 is further configured to perform the following steps:

parsing out service node information of the second service node from the third uplink data packet, after the receiving a third uplink data packet sent by a second service node; and saving the service node information of the second service node into a bidirectional flow table.

In some embodiments of the present disclosure, when the service node information of the second service node is a device index of the second service node, the processor 1403 is further configured to perform the following step: querying, according to a mapping relationship table set by a controller, an Internet Protocol IP address corresponding to the device index of the second service node, after the parsing out service node information of the second service node from the third uplink data packet.

In some embodiments of the present disclosure, the processor 1403 is configured to perform the following step: saving the IP address corresponding to the device index of the second service node into the bidirectional flow table.

In some embodiments of the present disclosure, the processor 1403 is further configured to perform the following step:

sending the service node information of the second service node to a third delivery node, after the parsing out service node information of the second service node from the third uplink data packet, where the third delivery node is another uplink egress delivery node except the second delivery node in the service chain.

In some embodiments of the present disclosure, the processor 1403 is further configured to perform the following steps:

after the sending the third uplink data packet to a destination device, receiving a first downlink data packet that is returned by the destination device according to the third uplink data packet; and sending the first downlink data packet to the second service node.

In some embodiments of the present disclosure, the processor 1403 is configured to perform the following step:

sending the first downlink data packet to the second service node according to the bidirectional flow table.

As can be known from the description of the present disclosure in the foregoing embodiment, a first service node sends a first uplink data packet to a next-hop service node according to service node information corresponding to a service chain and enables the first uplink data packet to reach the last service node (that is, a second service node) in an uplink direction of the service chain. The last service node performs service processing on the first uplink data packet to obtain a second uplink data packet, deletes the service node information from the second uplink data packet, and sends a third uplink data packet obtained after the service node information is deleted to a second delivery node. The second delivery node, as an uplink egress delivery node of the service chain, receives the third uplink data packet and sends the third uplink data packet to a destination device. Because in a data packet processing system, when service processing is performed on an uplink data packet, a first delivery node and a second delivery node are respectively used as an uplink ingress delivery node and an uplink egress delivery node of the uplink data packet, that is, delivery nodes are designed in a distributed manner in a data packet center system, and two delivery nodes are used to perform ingress delivery and egress delivery on the uplink data packet, the uplink data packet needs to pass through each of the first delivery node and the second delivery node only once, which can improve the data packet processing efficiency.

In addition, it should be noted that the described apparatus embodiment is merely exemplary. The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments. In addition, in the accompanying drawings of the apparatus embodiments provided by the present disclosure, connection relationships between the modules indicate that the modules have communication connections with each other, which may be implemented as one or more communications buses or signal cables. Persons of ordinary skill in the art may understand and implement the embodiments of the present disclosure without creative efforts.

Based on the description of the foregoing implementation manners, persons skilled in the art may clearly understand that the present disclosure may be implemented by software in addition to universal hardware, or by dedicated hardware, including an application-specific integrated circuit, a dedicated central processing unit (CPU), a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for the present disclosure, software program implementation is a better implementation manner in most cases. Based on such an understanding, the technical solutions of the present disclosure essentially or the part contributing to the prior art may be implemented in a form of a software product. The computer software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, or the like) to perform the methods described in the embodiments of the present disclosure.

In summary, the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present disclosure. Additionally, statements made herein characterizing the invention refer to an embodiment of the invention and not necessarily all embodiments.

What is claimed is:

1. A data packet processing method comprising:
receiving, by a second service node, a first uplink data packet from a first service node, wherein the first uplink data packet carries service node information corresponding to a service chain determined by a first delivery node, wherein the first service node is a previous-hop service node adjacent to the second service node in the service chain, and wherein the first delivery node is an uplink ingress delivery node of the service chain;
performing, by the second service node, service processing on the first uplink data packet, to obtain a second uplink data packet;
determining, by the second service node, that the second service node is the last service node in an uplink direction of the service chain;
deleting, by the second service node, in response to determining that the second service node is the last service node in an uplink direction of the service chain, the service node information from the second uplink data packet to obtain a third uplink data packet; and
sending, by the second service node, the third uplink data packet to a second delivery node, wherein the second delivery node is an uplink egress delivery node of the service chain.

2. The method according to claim 1, wherein before sending the third uplink data packet to the second delivery node, the method further comprises:
querying, by the second service node, an uplink egress delivery node of the third uplink data packet according to a bidirectional flow table; and
wherein the third uplink data packet is sent to the second delivery node according to the bidirectional flow table or a forwarding route based on whether the querying returns an uplink egress delivery node or not, respectively.

3. The method according to claim 2, wherein before sending the third uplink data packet to the second delivery node, the method further comprises:
encapsulating, by the second service node, service node information of the second service node into the third uplink data packet.

4. The method according to claim 1, wherein after sending the third uplink data packet to the second delivery node, the method further comprises:
receiving, by the second service node, a first downlink data packet from the second delivery node;
performing, by the second service node, service processing on the first downlink data packet to obtain a second downlink data packet;
determining, by the second service node according to a bidirectional flow table, that the second downlink data packet is a downlink data packet in the service chain;
encapsulating, by the second service node, the service node information of the service chain into the second downlink data packet to obtain a third downlink data packet; and
sending, by the second service node, the third downlink data packet to the first service node.

5. The method according to claim 4, wherein after determining that the second downlink data packet is a downlink data packet in the service chain, the method further comprises:
saving, by the second service node, delivery node information of the second delivery node into the bidirectional flow table.

6. A data packet processing method applied in a system comprising a plurality of service nodes which form a service chain, a first delivery node and a second delivery node, the method comprising:
receiving, by the second delivery node, a third uplink data packet from a second service node, wherein the second service node is the last service node in an uplink direction of the service chain which is determined by the first delivery node, and wherein the second delivery node is an uplink egress delivery node of the service chain and the first delivery node is an uplink ingress delivery node of the service chain;
obtaining, by the second delivery node, service node information of the second service node from the third uplink data packet, wherein the service node information includes a device index of the second service node;
querying, by the second delivery node according to a mapping relationship table set by a controller, an Internet Protocol (IP) address corresponding to the device index of the second service node;
saving, by the second delivery node, the service node information of the second service node into a bidirectional flow table; and
sending, by the second delivery node, the third uplink data packet to a destination device, wherein the second delivery node is deployed before the destination device.

7. The method according to claim 6, wherein after obtaining the service node information of the second service node from the third uplink data packet, the method further comprises:
sending, by the second delivery node, the service node information of the second service node to a third delivery node, wherein the third delivery node is another uplink egress delivery node other than the second delivery node in the service chain.

8. The method according to claim 6, wherein after sending the third uplink data packet to the destination device, the method further comprises:
receiving, by the second delivery node, a first downlink data packet that is returned by the destination device according to the third uplink data packet; and
sending, by the second delivery node, the first downlink data packet to the second service node.

9. The method according to claim 8, wherein the first downlink data packet is sent to the second service node according to a bidirectional flow table.

10. A service node, wherein the service node is a second service node, comprising a processor and a non-transitory computer-readable medium having processor-executable instructions stored thereon, wherein execution of the processor-executable instructions by the processor facilitates:
receiving a first uplink data packet from a first service node, wherein the first uplink data packet carries service node information corresponding to a service chain determined by a first delivery node, wherein the first service node is a previous-hop service node adjacent to the second service node in the service chain, and wherein the first delivery node is an uplink ingress delivery node of the service chain;

performing service processing on the first uplink data packet to obtain a second uplink data packet;

determining, by the second service node, that the second service node is the last service node in an uplink direction of the service chain;

deleting, in response to determining that the second service node is the last service node in an uplink direction of the service chain, the service node information from the second uplink data packet to obtain a third uplink data packet; and sending the third uplink data packet to a second delivery node, wherein the second delivery node is an uplink egress delivery node of the service chain.

11. The service node according to claim 10, wherein execution of the processor-executable instructions by the processor further facilitates:

before sending the third uplink data packet to the second delivery node, querying an uplink egress delivery node of the third uplink data packet according to a bidirectional flow table; and if the querying does not result in the uplink egress delivery node being obtained, sending the third uplink data packet to the second delivery node according to a forwarding route; or if the query module results in the uplink egress delivery node being obtained, sending the third uplink data packet to the second delivery node according to the bidirectional flow table.

12. The service node according to claim 11, wherein execution of the processor-executable instructions by the processor further facilitates:

before sending the third uplink data packet to the second delivery node, encapsulating service node information of the second service node into the third uplink data packet.

13. The service node according to claim 10, wherein execution of the processor-executable instructions by the processor further facilitates:

after sending the third uplink data packet to the second delivery node, receiving a first downlink data packet from the second delivery node;

performing service processing on the first downlink data packet to obtain a second downlink data packet;

encapsulating the service node information of the service chain into the second downlink data packet to obtain a third downlink data packet; and sending the third downlink data packet to the first service node.

14. The service node according to claim 13, wherein execution of the processor-executable instructions by the processor further facilitates:

after determining, according to the bidirectional flow table, that the second downlink data packet is a downlink data packet in the service chain, saving delivery node information of the second delivery node into the bidirectional flow table.

15. A delivery node applied in a system comprising a plurality of service nodes which form a service chain, a first delivery node and a second delivery node, wherein the delivery node is the second delivery node of the service chain, the delivery node comprising a processor and a non-transitory computer-readable medium having processor-executable instructions stored thereon, wherein execution of the processor-executable instructions by the processor facilitates:

receiving a third uplink data packet from a second service node, wherein the second service node is the last service node in an uplink direction of the service chain which is determined by the first delivery node, and wherein the second delivery node is an uplink egress delivery node of the service chain and the first delivery node is an uplink ingress delivery node of the service chain;

after receiving the third uplink data packet from the second service node, obtaining service node information of the second service node from the third uplink data packet, wherein the service node information of the second service node includes a device index of the second service node;

querying, according to a mapping relationship table set by a controller, an Internet Protocol (IP) address corresponding to the device index of the second service node;

saving the service node information and the IP address into the bidirectional flow table; and sending the third uplink data packet to a destination device, wherein the second delivery node is deployed before the destination device.

16. The delivery node according to claim 15, wherein execution of the processor-executable instructions by the processor further facilitates:

after obtaining the service node information of the second service node from the third uplink data packet, sending the service node information of the second service node to a third delivery node, wherein the third delivery node is another uplink egress delivery node other than the second delivery node in the service chain.

17. A system comprising:

first and second service nodes and first and second delivery nodes, wherein the first and second service are in a service chain;

the second service node comprising a processor and a non-transitory computer-readable medium having processor-executable instructions stored thereon, wherein execution of the processor-executable instructions by the processor facilitates:

receiving a first uplink data packet from the first service node, wherein (a) the first uplink data packet carries service node information corresponding to the service chain determined by the first delivery node, (b) the first service node is a previous-hop service node adjacent to the second service node in the service chain, and (c) the first delivery node is an uplink ingress delivery node of the service chain; and processing the first uplink data packet to obtain a second uplink data packet;

determining whether the second service node is the last service node in an uplink direction of the service chain;

deleting the service node information from the second uplink data packet to obtain a third uplink data packet in response to determining that the second service node is the last service node in the uplink direction of the service chain; and sending the third uplink data packet to the second delivery node, which is an uplink egress delivery node of the service chain; and the second delivery node comprises a processor and a non-transitory computer-readable medium having processor-executable instructions stored thereon, wherein execution of the processor-executable instructions by the processor facilitates:

receiving the third uplink data packet from the second service node; and sending the third uplink data packet to a destination device, wherein the second delivery node is deployed before the destination device.

18. The system according to claim 17, wherein before sending the third uplink data packet, the processor of the second delivery node further facilities the following operations when executing the instructions stored in the non-transitory computer readable medium:
   obtaining service node information of the second service node from the third uplink data packet, wherein the service node information includes a device index of the second service node;
   querying, according to a mapping relationship table, an Internet Protocol (IP) address corresponding to the device index of the second service node; and
   saving the service node information and the IP address into the bidirectional flow table.

19. The system according to claim 17, wherein execution of the processor-executable instructions by the processor of the second service node further facilitates:
   before sending the third uplink data packet to the second delivery node, querying an uplink egress delivery node of the third uplink data packet according to a bidirectional flow table; and
   if the querying does not result in the uplink egress delivery node being obtained, sending the third uplink data packet to the second delivery node according to a forwarding route; or if the query module results in the uplink egress delivery node being obtained, sending the third uplink data packet to the second delivery node according to the bidirectional flow table.

20. The system according to claim 18, wherein execution of the processor-executable instructions by the processor of the second service node further facilitates:
   after sending the third uplink data packet to the second delivery node, receiving a first downlink data packet from the second delivery node;
   performing service processing on the first downlink data packet to obtain a second downlink data packet;
   encapsulating the service node information of the service chain into the second downlink data packet to obtain a third downlink data packet; and
   sending the third downlink data packet to the first service node.

* * * * *